US005491647A

United States Patent [19]

O'Brien et al.

[11] Patent Number: 5,491,647

[45] Date of Patent: Feb. 13, 1996

[54] METHOD AND APPARATUS FOR CONTROLLING A PRESS

[75] Inventors: Michael J. O'Brien, Carrollton; Robert M. Carabbio, Highland Village; Bill Hemsath; Kevin D. Knussmann, both of Carrollton; Thomas C. Robbins, Dallas, all of Tex.

[73] Assignee: Signature Technologies, Inc., Carrollton, Tex.

[21] Appl. No.: 320,837

[22] Filed: Oct. 7, 1994

Related U.S. Application Data

[63] Continuation of Ser. No. 195,490, Feb. 14, 1994, abandoned, which is a continuation of Ser. No. 817,691, Jan. 7, 1992, abandoned.

[51] Int. Cl.$^6$ .............................. B30B 15/26; G06F 19/00

[52] U.S. Cl. ......................... 364/551.02; 100/43; 100/50; 100/99; 364/476; 364/550; 364/551.01

[58] Field of Search ................................. 100/43, 50, 99; 364/476, 550, 551.01, 551.02, 552

[56] References Cited

U.S. PATENT DOCUMENTS

| | | | |
|---|---|---|---|
| 3,257,652 | 6/1966 | Foster | 340/521 |
| 3,680,365 | 8/1972 | Summers | 73/88.5 R |
| 3,825,811 | 7/1974 | Smith et al. | 318/646 |
| 4,016,744 | 4/1977 | Williams et al. | 73/11 |
| 4,023,044 | 5/1977 | Miller et al. | 307/116 |
| 4,048,848 | 9/1977 | Dybel | 73/88.5 R |
| 4,059,991 | 11/1977 | Dybel et al. | 73/88.5 R |
| 4,062,055 | 12/1977 | Dybel et al. | 361/160 |
| 4,088,899 | 5/1978 | Miller et al. | 307/116 |
| 4,116,050 | 9/1978 | Tanahashi et al. | 100/99 X |
| 4,171,646 | 10/1979 | Dybel et al. | 73/808 |
| 4,177,517 | 12/1979 | Mette et al. | 364/559 |
| 4,195,563 | 4/1980 | Budraitis et al. | 100/99 |
| 4,207,567 | 6/1980 | Juengel et al. | 340/680 |
| 4,260,986 | 4/1981 | Kobayashi et al. | 340/680 |
| 4,289,022 | 9/1981 | Dybel et al. | 73/862.64 |
| 4,429,627 | 2/1984 | Edsö | 100/43 |
| 4,445,093 | 4/1984 | Kohler | 328/151 |
| 4,453,421 | 6/1984 | Umano | 364/508 X |
| 4,504,920 | 3/1985 | Mickowski | 364/550 |
| 4,519,040 | 5/1985 | Brankamp et al. | 364/153 |
| 4,524,582 | 6/1985 | Lucas et al. | 60/421 |
| 4,527,156 | 7/1985 | Nawrocki et al. | 340/753 |
| 4,554,534 | 11/1985 | Jones | 340/665 |
| 4,633,720 | 1/1987 | Dybel et al. | 364/506 X |
| 4,695,965 | 9/1987 | Fujita et al. | 364/550 X |
| 4,721,028 | 1/1988 | Lucas et al. | 91/433 |
| 4,723,429 | 2/1988 | Weber et al. | 72/20 |
| 4,750,131 | 6/1988 | Martinez | 364/476 |
| 4,766,758 | 8/1988 | Lucas et al. | 73/1 B |
| 4,939,665 | 7/1990 | Gold et al. | 364/476 |
| 4,987,528 | 1/1991 | O'Brien | 364/184 |
| 5,289,388 | 2/1994 | Dahroug et al. | 364/476 X |
| 5,423,199 | 6/1995 | Mangrulkar | 364/552 X |
| 5,440,499 | 8/1995 | Rasmussen | 364/551.01 |

FOREIGN PATENT DOCUMENTS

| | | |
|---|---|---|
| 3715077A1 | 1/1988 | Germany . |

*Primary Examiner*—Edward R. Cosimano
*Attorney, Agent, or Firm*—Pearne, Gordon, McCoy & Granger

[57] ABSTRACT

A process controller disposed to monitor and control a press. The controller monitors an appropriate variable at the press representative of the force produced at the workpiece upon which the press is operating, and compares this force to historical force data associated with the position at which the force was sampled. The historical data is stored in the form of control arrays, where the control arrays are calculated based upon one or more signature arrays stored during satisfactory press operations upon a similar workpiece. The calculation of the control arrays takes into account the deviations in the variables monitored at the press, which may include force and position. While monitoring the press based upon the HIGH and LOW control arrays, each force value is compared to the values in the HIGH and LOW control arrays at the time of sampling. The press controller is configured to monitor and control a high speed press and provides control functions during the particular press cycle in which unacceptable sample is taken.

1 Claim, 22 Drawing Sheets

METHOD AND APPARATUS FOR CONTROLLING A PRESS

This is a continuation of application Ser. No. 08/195,490, filed Feb. 14, 1994, now abandoned, which is a continuation of application Ser. No. 07/817,691, filed Jan. 7, 1992, now abandoned.

FIELD OF THE INVENTION

The present invention relates to a process controller. In particular, the present invention relates to a process controller for accurately analyzing the load at a press at each of a plurality of positions in a press cycle. The process controller is configured to permit the press to operate at high speeds.

BACKGROUND OF THE INVENTION

In general, a press is a device which applies a force to a workpiece, where the force may vary from position to position during one cycle of the press. By way of example, various press types include presses for forming, punching, mold closing, compressing, bending, drawing or injection molding. In general, to monitor and control presses of these types, two variables (dimensions) are monitored at the press. The first variable is an absolute position in the press cycle. Absolute position may be the position of the tool associated with the press. Typically, position in a press having a rotating drive mechanism whose angular position is directly related to the absolute position in the press cycle is determined by a position feedback device or transducer such as an encoder or resolver which provides a signal representative of a position in the press cycle. For presses lacking a rotating drive mechanism whose angular position is directly related to the absolute position in the press cycle, a linear resolver is typically used to provide a signal which is representative of the linear position of a press. The second variable is force. Force may be monitored by a sensor or transducer exposed to fluid pressure or to strain in the press or its tooling in such a way as to produce a signal related to the process force necessary to effect the process performed by the press.

Apparatus and methods for monitoring and controlling presses are known. In particular, U.S. Pat. No. 4,987,528, issued to Michael J. O'Brien on Jan. 22, 1991 (hereinafter referred to as the '528 patent) discloses a signature analysis control system for a press. This system monitors forces at the press throughout the press cycle and may initiate an action such as shutting off the press if the monitored forces are determined to be unacceptable. To determine whether or not forces at a press are acceptable for a given cycle of the press, the force signature for a given cycle of the press is compared to arrays of upper and lower reference values. The upper reference values may be developed by adding a set of offset values to a reference signature, and the lower reference values may be developed by subtracting a second set of offset values from the reference signature. Other types of press monitoring and/or control systems are discussed in U.S. Pat. No. 3,257,652 issued to George B. Foster on Jun. 21, 1966; U.S. Pat. No. 3,680,365 issued to McGarvey G. Summers on Aug. 1, 1972; U.S. Pat. No. 4,016,744 issued to Williams et al. on Apr. 12, 1977; U.S. Pat. No. 4,023,044 issued to Miller et al. on May 10, 1977; U.S. Pat. No. 4,048,848 issued to Frank R. Dybel on Sep. 20, 1977; U.S. Pat. No. 4,059,991 issued to Dybel et al. on Nov. 29, 1977; U.S. Pat. No. 4,062,055 issued to Dybel et al. on Dec. 6, 1977; U.S. Pat. No. 4,088,899 issued to Miller et al. on May 9, 1978; U.S. Pat. No. 4,116,050 issued to Tanahashi et al. on Sep. 26, 1978; U.S. Pat. No. 4,171,646 issued to Dybel et al. on Oct. 23, 1979; U.S. Pat. No. 4,177,517 issued to Mette et al. on Dec. 4, 1979; U.S. Pat. No. 4,195,563 issued to Budraitis et al. on Apr. 1, 1980; U.S. Pat. No. 4,207,567 issued to Richard O. Juengel on Jun. 10, 1980; U.S. Pat. No. 4,260,986 issued to Kobayaski et al. on Apr. 7, 1981; U.S. Pat. No. 4,289,022 issued to Dybel et al. on Sep. 15, 1981; U.S. Pat. No. 4,445,093 issued to Robert D. Kohler on Apr. 24, 1984; U.S. Pat. No. 4,453,421 issued to Yasuhiro Umano on Jun. 12, 1984; U.S. Pat. No. 4,504,920 issued to John Mickowski on Mar. 12, 1985; U.S. Pat. No. 4,519,040 issued to Brankamp et al. on May 21, 1985; U.S. Pat. No. 4,524,582 issued to Lucas et al. on Jun. 25, 1985; U.S. Pat. No. 4,527,156 issued to Nawrocki et al. on Jul. 2, 1985; U.S. Pat. No. 4,554,534 issued to William J. Jones on Nov. 19, 1985; U.S. Pat. No. 4,633,720, issued to Dybel, et al. on Jan. 6, 1987; U.S. Pat. No. 4,695,965 issued to Fujita et al. on Sep. 22, 1987; U.S. Pat. No. 4,721,028 issued to Lucas et al. on Jan. 26, 1988; U.S. Pat. No. 4,723,429 issued to Weber et al. on Feb. 9, 1988; U.S. Pat. No. 4,750,131 issued to Miguel R. Martinez on Jun. 7, 1988; U.S. Pat. No. 4,766,758 issued to Lucas et al. on Aug. 30, 1988; U.S. Pat. No. 4,939,665 issued to Gold et al. on Jul. 3, 1990; and German Patent Document No. DE 3715077 A1.

While press controllers having various schemes for monitoring stamping presses are known, it is important to provide a press control which monitors the sequence of loads which occur at the press and analyze these loads in such a way which does not cause spurious shutdowns of the press. Typically, press controls are used in high volume press operations to ensure the quality of the products produced by the press. Additionally, these presses may operate in the range of 500–1,000 cycles per minute, where shutting down the press, due to inaccurate monitoring of the press, results in substantial losses of money due to production shutdown.

However, while the method for analyzing the forces at a press must be tolerant enough to avoid spurious and unnecessary shutdowns, this tolerance must not be so large as to render the press controller ineffective with respect to detecting faulty parts at the press, or problems within the operating mechanisms of the press itself. Accordingly, while a number of systems are available for monitoring and analyzing the forces at a press, it would be desirable to provide a system for monitoring the forces at a press which avoids analyzing press forces in such a way to produce undesirable press shutdowns while also accurately detecting faulty parts produced by the press and problems in the operating mechanisms of the press.

As discussed above, presses which are typically fitted with press controls are high production presses. Thus, while it is desirable to sample the force at a press throughout a press cycle, and as frequently as possible, this task is difficult due to the limitations imposed by press control hardware, e.g., the speed of the hardware under many circumstances is not sufficient to monitor and analyze the forces in a high speed press with enough resolution with respect to force and position in the cycle to be effective. Accordingly, it would be advantageous to provide a press control which is capable of variably or selectively changing the position resolution for portions of the press cycle which are particularly important, e.g., increasing the position resolution during a critical portion of a press cycle such as the portion of the cycle where a tool is operating on a workpiece, as opposed to the portion of the cycle where the press is merely bringing the tool toward the workpiece. By increasing the position resolution during the portion of the press cycle where the tooling is operating on the workpieces, the profile or signature of the forces used in the formation of the finished workpiece is more accurately recorded.

Another problem which is encountered with press controls for press operations is the situation where a press, such as a hydraulic press or press driven by a crankshaft, undergoes a reversal in the position of the tool due to elasticity in the press and mechanism for driving the tool. By way of example, this situation may occur during punching operations when the tool breaks through the material being punched.

SUMMARY OF THE INVENTION

The present invention provides a controller for monitoring an apparatus which performs a process such as a press. The apparatus includes a first device such as a force or pressure sensor disposed to produce a first signal representative of a first process variable such as force or pressure. A second device such as a position transducer is disposed to produce a signal representative of a second process variable such as rotational or linear motion. In one embodiment of the controller, a predetermined set of reference values, and second, third, fourth and fifth values associated with each reference value are stored. The second signal is sampled such that a sampling signal is produced when a change in the second signal occurs which is greater than a predefined limit. In response to a sampling signal, a first signal value representative of the first signal and a second signal value representative of the second signal are produced. The second signal value is compared to the set of reference values, and the reference value to which the second signal value is substantially equal is determined. The first signal value is compared to the second, third, fourth and fifth values associated with the reference value when the second signal value is substantially equal to one of the reference values, where the comparison may be performed prior to a subsequent sampling of the second signal by the sampling circuit.

In one embodiment of the controller, where the controller controls a cyclical process, the controller may be configured to compare the first value to at least one value associated with the reference value only when the process is progressing forward. In another embodiment of the controller, where the controller controls a cyclical process, the controller may be configured to compare the first value to at least one value associated with the reference value at more than one frequency throughout a cycle.

DETAILED DESCRIPTION OF THE PREFERRED EMBODIMENT

Figure 1:
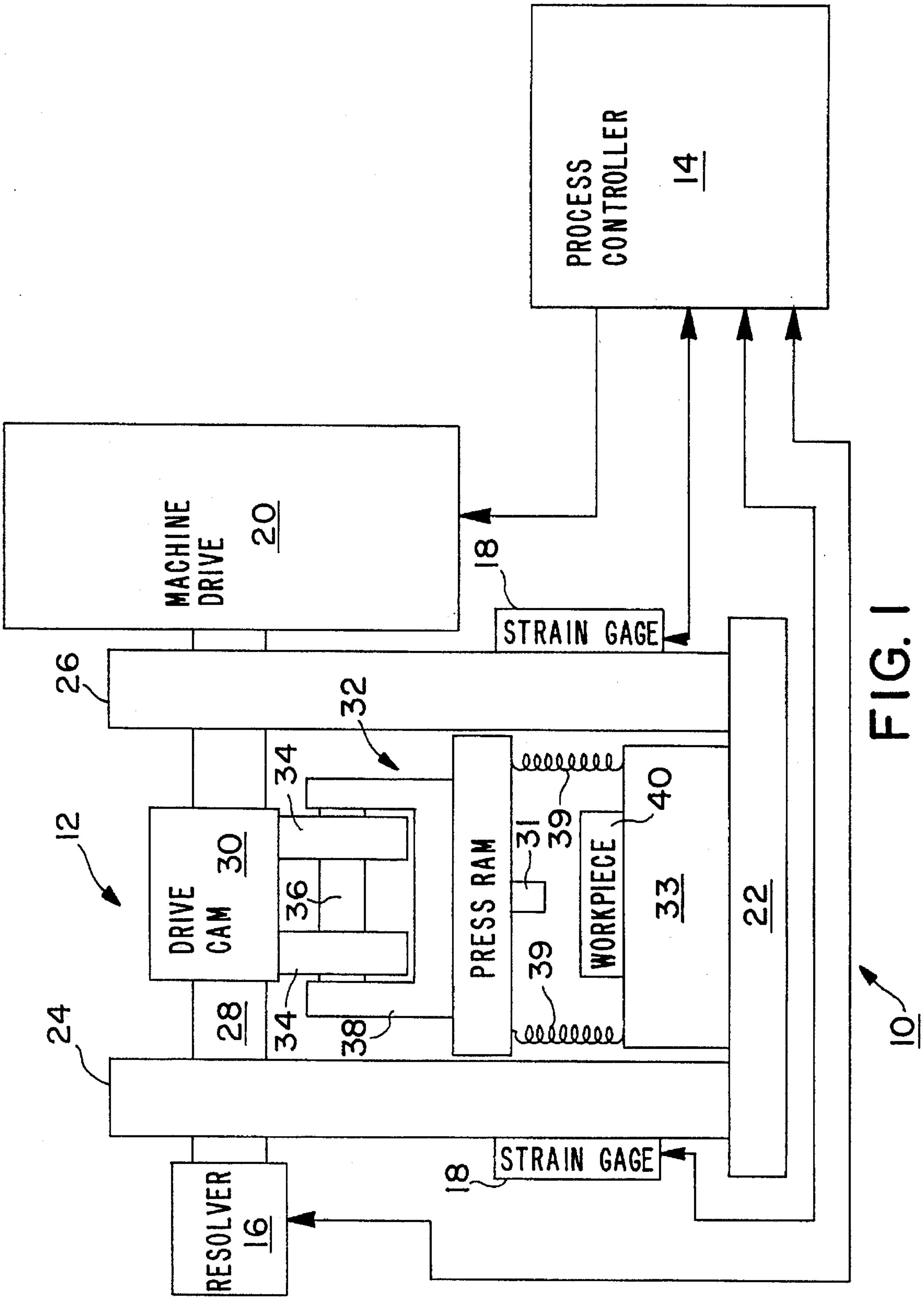
FIG. 1 is a block diagram of a press system configure in accordance with an embodiment of the present invention.

Referring to FIG. 1, FIG. 1 illustrates a press system 10. System 10 includes a punching press 12, a process controller 14, a resolver 16, strain gauges 18, and a machine drive 20. Press 12 includes a support frame having a base 22, a first press support member 24, and a second press support member 26. Base 22, member 24 and member 26 are arranged and fastened together as illustrated in FIG. 1 in a conventional manner. A drive shaft 28 is rotatably supported between members 24 and 26 by a pair of appropriate bearings (not shown). Drive shaft 28 is mechanically coupled to a mechanism such as a machine drive 20 which includes a conventional motor and electric clutch arrangement. Shaft 28 is also engaged to, and supports, a drive cam 30. Additionally, press 12 includes a press RAM 32 having a pair of rollers 34 rotatably supported by a shaft 36 within a shaft support 38. Press ram 32 is engaged by, and supports, a top die (tool) 31, which is paired with a bottom die 33 supported by base 22. Four compression springs 39, located between die 33 and ram 32, bias ram 32 upwardly such that rollers 34 maintain contact with cam 30. Upon rotation of drive cam 30, the cam surface of cam 30 and interaction with rollers 34 cause ram 32, which is guided by members 24 and 26, to move downwardly such that top die 31 engages workpiece 40 and bottom die 33.

The preferred embodiment of process controller 14 will be described in reference to punching press 12 described above. However, it should be understood that process controller 14 is intended to be readily modified for use with various presses used for forming, punching, mold closing, compressing, bending, drawing or injection molding. These presses may require process controller 14 to be configured to function with sensor and transducers such as resolvers which are linear, and force sensing devices or sensors other than strain gauges 18.

Process controller 14 is coupled to resolver 16, strain gauges 18, and machine drive 20. In general, resolver 16 provides an absolute position signal to process controller 14, where the position signal is an analog signal representative of the rotational position of shaft 28, which in turn corresponds to the position of top die 31. Process controller 14 applies the appropriate voltage signal to resolver 16 such that resolver 16 can provide the position signal. The preferred embodiment of system 10 uses a resolver 16; however, process controller 14 is readily modifiable for use with other position sensing devices such as an encoder or dynamic optical potentiometer. Strain gauges 18 provide an analog voltage signal to process controller 14, where the signal is representative of the strain in members 24 and 26, which is representative of the force being applied by the press to top die 31 and workpiece 40. Process controller 14 provides an appropriate current source for the operation of strain gauges 18. Machine drive 20 may be controlled by process controller 14 such that drive 20 is turned on and off depending upon the analysis of the strain at gauges 18 in reference to the position of die 31 and RAM 32 as measured from resolver 16. Additionally, controller 14 may operate a part rejection device (not shown) based upon the analysis of the strain at gauges 18.

In general, process controller 14 is capable of sampling the voltages at gauges 18 at specific rotational positions of shaft 28 during the operation of press 12. Controller 14 is configured to sample the voltages at gauges 18 and the position signal from resolver 16 with very high resolution (e.g., 10–12 bits of resolution), even at very high press speeds (e.g., 500–1,000 cycles per minute). To further increase the resolution with respect to sampling strain gauges 18, process controller 14 may be configured to provide variable position resolution. More specifically, controller 14 may selectively change the position resolution for portions of the press cycle which are particularly important, e.g., increasing the position resolution during a critical portion of a press cycle such as the portion of the cycle where tool 31 punches or forms a workpiece. For many presses the speed of the tool is lower when the tool operates upon workpiece 40 than when the tool is being moved through the portion of its cycle when the tool is not in contact with workpiece 40. Thus, controller 14 will process more strain samples for an increased number of positions within a portion of the tool cycle when tool 31 is moving more slowly. This provides higher position resolution which, in turn, provides a better analysis of the forces at tool 31 during engagement within workpiece 40.

Process controller 14 may also be configured to provide forward-limited motion monitoring. More specifically, controller 14 may interrupt the sampling of strain gauges 18 in the situation where ram 32, and tool 31, undergo a reversal in direction of motion. This reversal of motion may be due to such effects as the elasticity of the press components, which may deflect to release energy in situations such as when die 31 breaks through workpiece 40 at the end of the punching operation.

To prevent the spurious shutdown of press 12, process controller 14 analyzes the values obtained from strain gauges 18 in reference to two arrays of upper limits and two arrays of lower limits. These limits are referenced to (associated with) the tool positions at which the limits are compared to strain values from gauges 18. This arrangement may provide press failure warning, press shutdown and part rejection signals due to press failures. The limit arrays are calculated and determined based upon sample signatures obtained from press 12 during known and satisfactory punching operations. The determination of the limit arrays are described in further detail below with reference to the program under which processor 14 operates.

Figure 2:
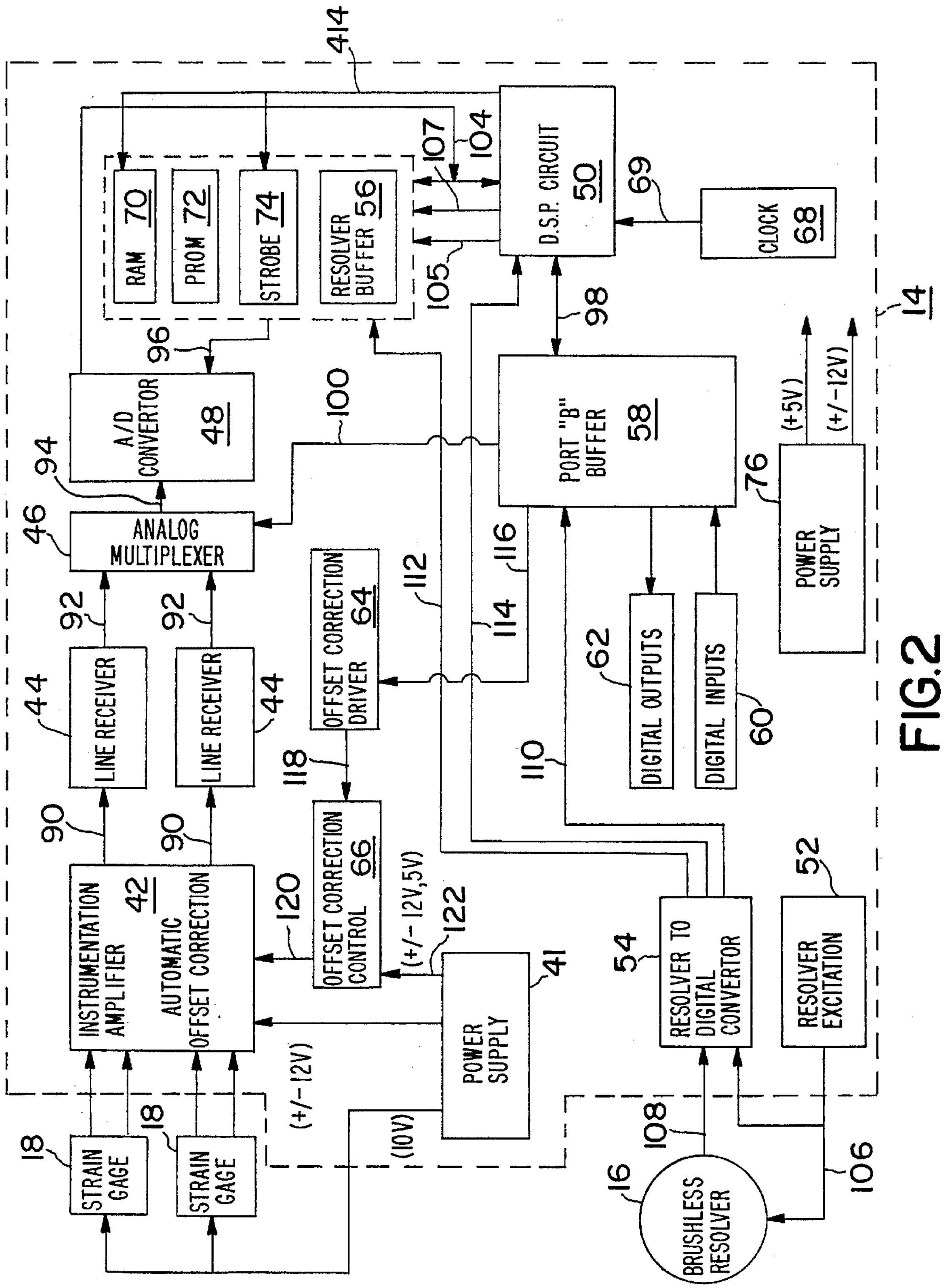
FIG. 2 is a block diagram of a process controller configured in accordance with an embodiment of the present invention.

Referring to FIG. 2, FIG. 2 illustrates the block diagram of process controller 14 as coupled to brushless resolver 16 of press 12 and strain gauges 18 of press 12. By way of example, brushless resolver 16 may be of the type having Model No. E7R-RL101 manufactured by Autotech corporation. Strain gauges 18 are coupled to a power supply 41 capable of providing ±12 volts, 10 volts, 5 volts and 3 volts. Power supply 41 is a conventional power supply configured to provide properly filtered and regulated DC voltages. Depending upon the type of strain gauges used for strain gauges 18, either a 10 or 3 volt excitation voltage may be applied to strain gauges 18.

Strain gauges 18 each provide a differential voltage to an instrumentation amplifier and automatic offset correction circuit 42. In general, this differential voltage is proportional to the strain in members 24 and 26 of press 12 and is a function of the current provided by supply 18, voltage of this current, and resistance of strain gauges 18. Since the strain in strain gauges 18, or average thereof, is proportional to the force at die 31, the force at die 31 is proportional to the voltage applied by strain gauges 18 to circuit 42. In particular, the voltage signal produced by gauges 18 is representative of the force applied by press 12 to tool 31, where tool 31 applies a force to workpiece 40.

In addition to circuit 42, process controller 14 includes two line receivers 44, an analog multiplexing circuit 46, an analog-to-digital converter 48, a digital signal processing circuit 50, a resolver excitation circuit 52, a resolver-to-digital converter circuit 54, a resolver buffer 56, a port B buffer 58, a digital input circuit 60, a digital output circuit 62, an offset correction driver circuit 64, an offset correction control circuit 66, a clock 68, RAM 70, PROM 72, a strobe generator 74, and a power supply 76. The detailed circuit diagram for controller 14 is discussed in detail below. In general, as discussed in part above, three types of input signals are applied to controller 14. These include the voltage signals from strain gauges 18 representative of the force at press ram 32, a voltage signal from resolver 16 representative of the absolute rotational position of shaft 28, and digital signals from digital input 60 which may be representative of user commands selectable from a keyboard or control panel.

DSP circuit 50 manipulates the inputs to produce outputs at digital outputs 62. For example, DSP circuit 50 may sample the digital values representative of the voltages at strain gauges 18 in reference to specific positions of tool 31, as monitored at shaft 28, which are sampled as digital signals from resolver-to-digital converter 54. Converter 54 converts the analog position signal from resolver 16 to a digital signal. In general, DSP circuit 50 provides sophisticated comparisons of the digital values representative of the force at tool 31, the position of tool 31, and sets or arrays of data for data acquisition positions and associated force limit values stored in RAM 70 and/or PROM 72. Alternatively, these comparisons can be performed by a general purpose microprocessor instead of a digital signal processor.

Referring more specifically to controller 14, instrumentation amplifier and automatic offset correction circuit 42 provides amplification for the voltages from gauges 18 with a switchable gain which is either in the range of 1,000 for low level signals, or at 2 for high level inputs. Circuit 42 also outputs differential signals representative of the voltages at gauges 18. Circuit 42 also zeros its amplified output, applied to line receivers 44, in response to an auto zero signal provided by offset correction control circuit 66. The auto zero signal is a pulse having a duration in the range of 10 milliseconds which allows circuit 42 to provide zeroing. The auto zero signal is applied to circuit 42 at least once every press cycle (e.g., top dead center) when tool 31 is not operating on workpiece 40 so that circuit 42 may compensate for drift caused by factors such as press deflection, temperature changes in the press, temperature changes at circuit 42, component aging, and strain gauge aging. Power for circuit 42 is provided by power supply 41 in the form of +12 volts and −12 volts. The amplified voltage signals from strain gauges 18 are applied by circuit 42 to line receiver circuits 44 via two pair of data conductors 90.

Circuits 44 are configured to reject common mode noise which may be introduced into the conductors running between circuit 42 and circuits 44. Circuit 42 applies a differential voltage to circuits 44. Circuits 44 manipulate the differential voltage such that a filtered single-ended voltage is applied to multiplexer circuit 46 via data conductors 92.

Multiplexer circuit 46 is provided to select an input channel and apply a buffered output voltage to analog-to-digital converter 48 via data conductor 94. In the present embodiment, circuit 46 selects between one of the voltage signals from line receivers 44 which is representative of the respective voltage, and corresponding force applied to the respective member 24 or 26. The cooperation of circuits 42, 44 and 46 provide properly conditioned voltage signals referenced to the analog ground of arrangement 10. These voltage signals are representative of (substantially proportional to) the strains at gauges 18, which are proportional to the forces in members 24 and 26. Of course, circuit 42 may be modified to monitor more than two strain gauges 18, where the appropriate number of line receivers are used and multiplexer 46 is configured to handle the corresponding number of channels.

Analog-to-digital converter 48 converts the conditioned voltage signals from multiplexer circuit 46 to 12 bit digital signals representative of strain (proportional to the forces at members 24 and 26). Analog-to-digital converter 48 provides sampling of the conditioned voltage signals from multiplexer circuit 46 in response to a strobe signal which controls the start time of each A/D conversion. The strobe signal is provided to A/D converter 48 from DSP circuit 50 via strobe generator 74. DSP circuit 50 also provides a channel select signal to multiplexer circuit 46 for the purpose of selecting the appropriate channel in conjunction with the strobe signal. DSP circuit 50 provides the channel select signal to multiplexer 46 via data bus 98, port B buffer 58, and data bus 100. The digital signal, representative of a corresponding force at either member 24 or 26, is applied to DSP circuit 58 over data bus 104.

Referring again to resolver 16, resolver excitation circuit 52 provides a 2.5 kHz sine wave to resolver 16 and resolver-to-digital converter circuit 54 via line 106. Resolver 16 outputs two analog signals which are proportional to the sine and cosine of the absolute resolver shaft angle position (proportional to the absolute rotational position of shaft 28). These signals are applied to resolver-to-digital converter circuit 54 via data bus 108.

Figure 16A:
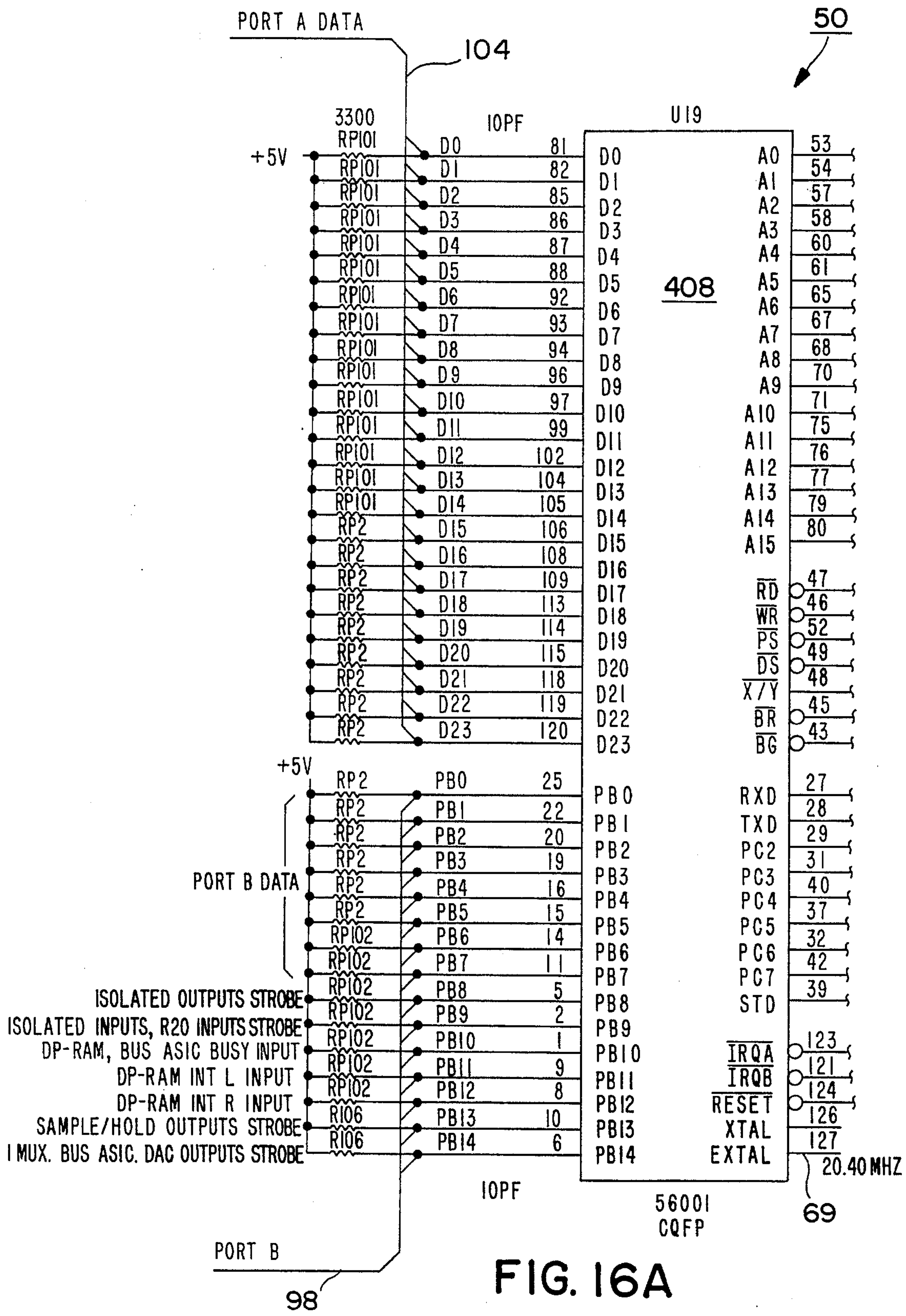
FIG. 16 is a DSP circuit configured in accordance with an embodiment of the present invention.
Figure 16B:
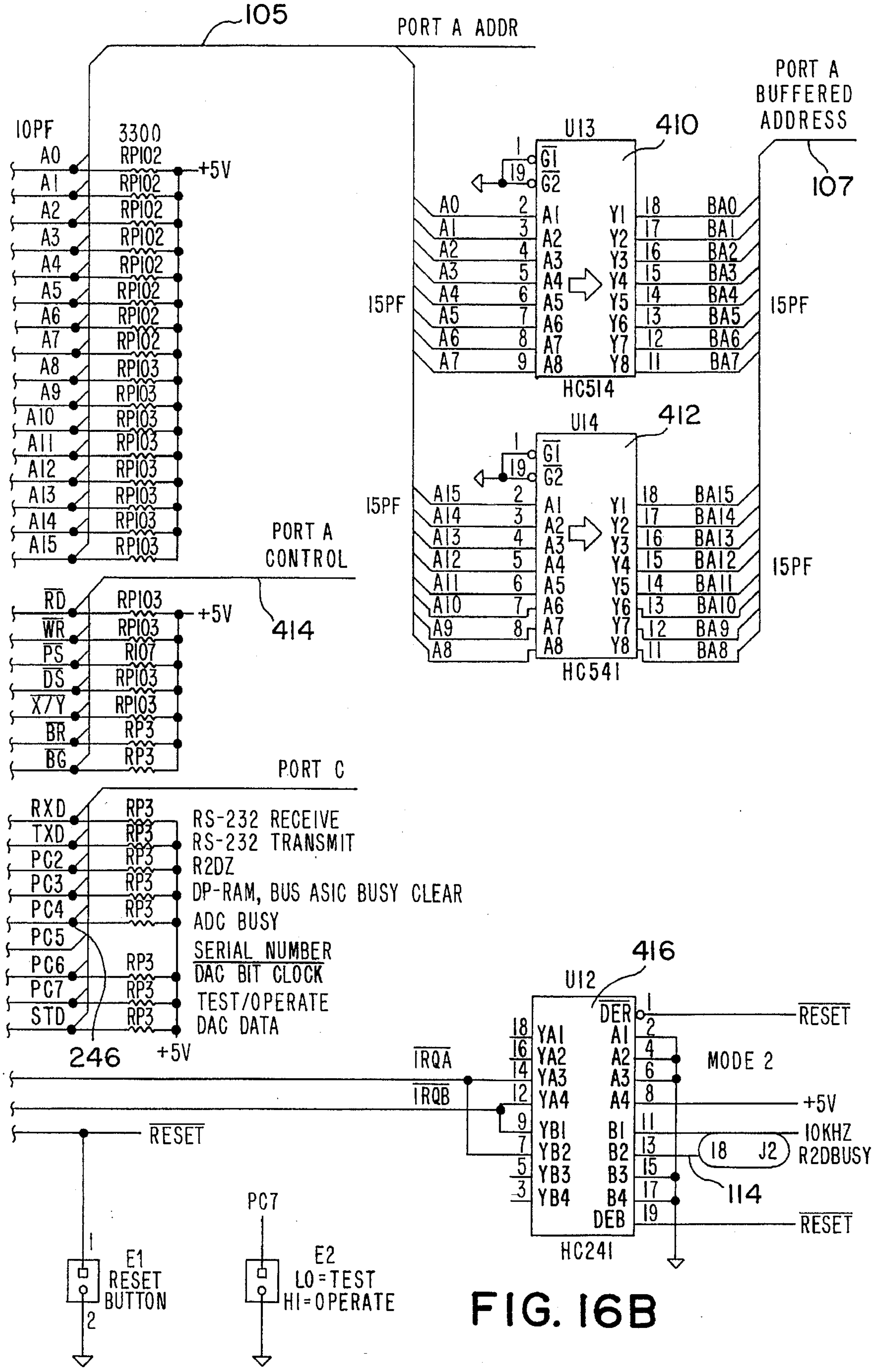

Resolver-to-digital converter circuit 54 outputs a resolution signal, an absolute resolver shaft angle position signal, and an interrupt signal. The resolution signal is applied to port B buffer 58 via data bus 110. The resolution signal indicates the number of bits of resolution with which the position signal is provided. The position signal is constantly output as a 10, 12, 14 or 16 bit digital signal representative of the absolute resolver shaft angle position based upon the two input signals from resolver 16. The position signal is applied to resolver buffer 56 over data bus 112. The interrupt signal is applied to DSP circuit 50 over data bus 114 to IRQA (FIG. 16). An interrupt signal is provided every time the position signal changes by a predetermined limit such as a change in the least significant bit of the position signal. The purpose of this arrangement is to interrupt DSP circuit 50 for purposes of updating the digital data it is using as the absolute position of shaft 28 only when a change in position occurs, i.e., the LSB of the position signal changes. The resolution signal applied to port B buffer 58 is provided since the resolution at which the voltages from strain gauges 18 are sampled may be changed by providing the appropriate wiring at circuit 54.

Resolver buffer 56 stores the N bit digital signal from converter 54 which is read by circuit 50 in response to the interrupt provided by converter 54 to circuit 50 data bus 114.

Digital input circuit 60 provides four input terminals for inputs such as push buttons and machine status signals, and provides optical isolation for these inputs. The input signals are applied to port B buffer 58 and periodically sampled by DSP circuit 50 as discussed in more detail below. Digital output circuit 62 provides four output terminals for outputs to control press functions such as shutdown, part rejection or warning indication. These outputs are also optically isolated. The output signals are provided by port B buffer 58, and updated by DSP circuit 50 immediately as a result of the analysis of data from strain gauges 18, resolver 16 and digital input 60.

Port B buffer 58 provides buffering for inputs and outputs of DSP circuit 50. More specifically, port B buffers the resolution signal input from circuit 54 and the inputs from circuit 62. Buffer 58 also buffers the channel select signal applied to circuit 46, the digital outputs applied to circuit 62, and an offset correction signal provided to offset correction driver circuit 64.

Offset correction driver circuit 64 receives the offset correction signal from DSP circuit 50 over data bus 116 and increases the duration of the offset correction signal from 200 nanoseconds to about 10 milliseconds. The output of circuit 64 is applied to offset correction control circuit 66.

Circuit 66 shapes the offset correction signal to a 10 millisecond pulse having about a 12 volt amplitude. The 12 volt output pulse of control 66 (auto zero signal) is applied to instrumentation amplifier and automatic offset correction circuit 42. As discussed above, circuit 42 utilizes the auto zero signal to compensate for drift. More specifically, circuit 42 will integrate the differential output voltage in response to several auto zero signals such that the output signal present at the times of the zero signals tends toward zero. Control 66 is provided ±12 volts and 5 volts for digital logic by power supply 41 via power conductor 122.

Clock 68 provides a 20.48 MHz signal which clocks DSP circuit 50. Clock 68 has a conventional configuration and is coupled to DSP circuit 50 by a data line 69.

RAM circuit 70 stores program data and other data such as limit arrays and current data arrays utilized by DSP circuit 50 for purposes of press control. PROM 72 stores the program executed by DSP 50 for purposes of analyzing signals from resolver 16, strain gauges 18, digital input 60, and data from RAM 70. Default data and programming data is stored in PROM 72 by conventional methods.

Strobe generator 74 provides an appropriate strobe for PROM 72, analog-to-digital converter 48 and resolver buffer 56. Each of these three strobes are timed differently, but all are initiated by DSP circuit 50 in response to the interrupt signal provided over data bus 114 by resolver-to-digital converter circuit 54. Accordingly, all of these strobes are controlled by the position of resolver 16 via the interrupt signal. The detailed description of the circuitry for process controller 14 will now be discussed below in reference to FIGS. 3–16.

Figure 3A:
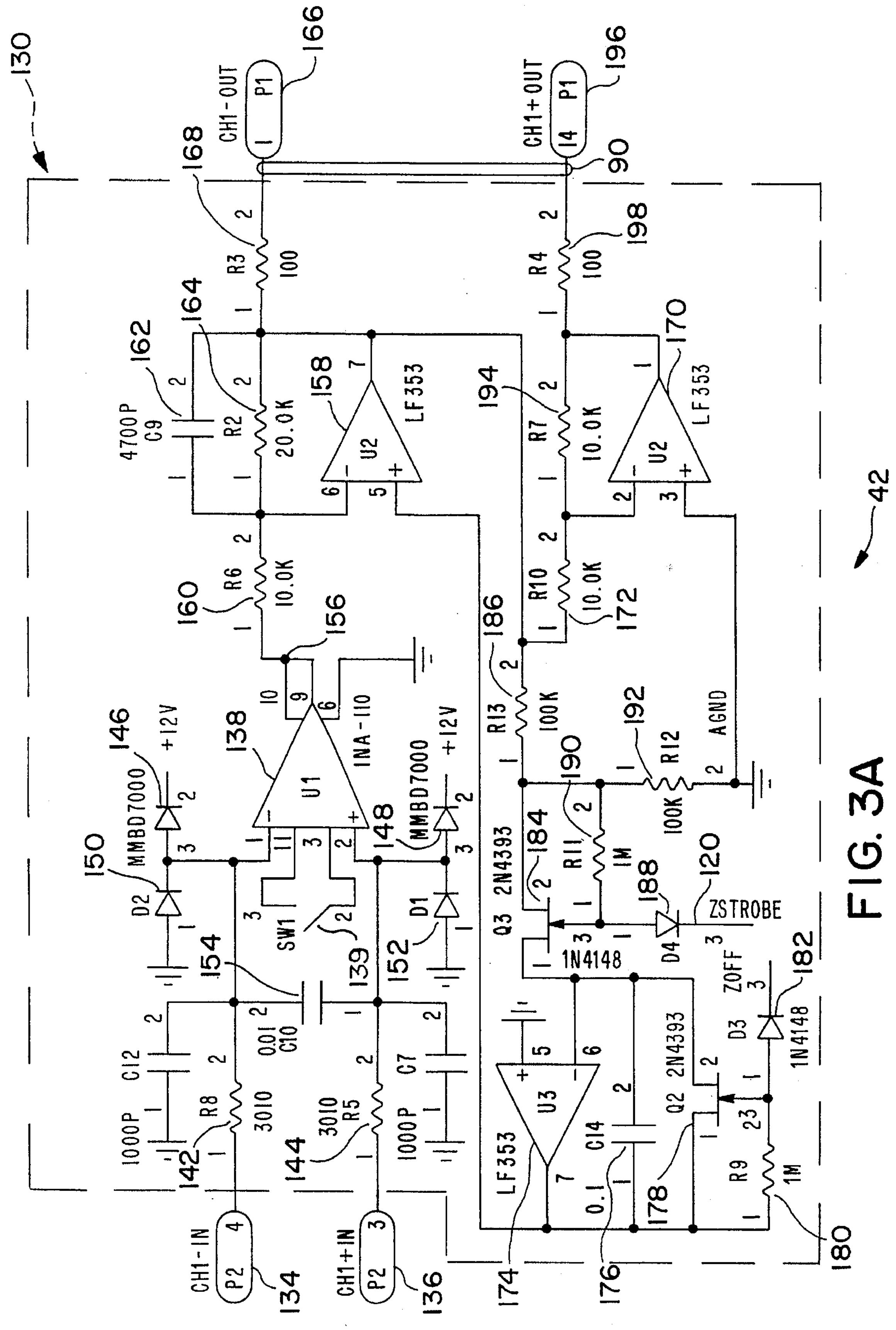
FIG. 3A is a schematic diagram of an instrumentation amplifier and automatic offset correction circuit configured in accordance with an embodiment of the present invention.
Figure 3B:
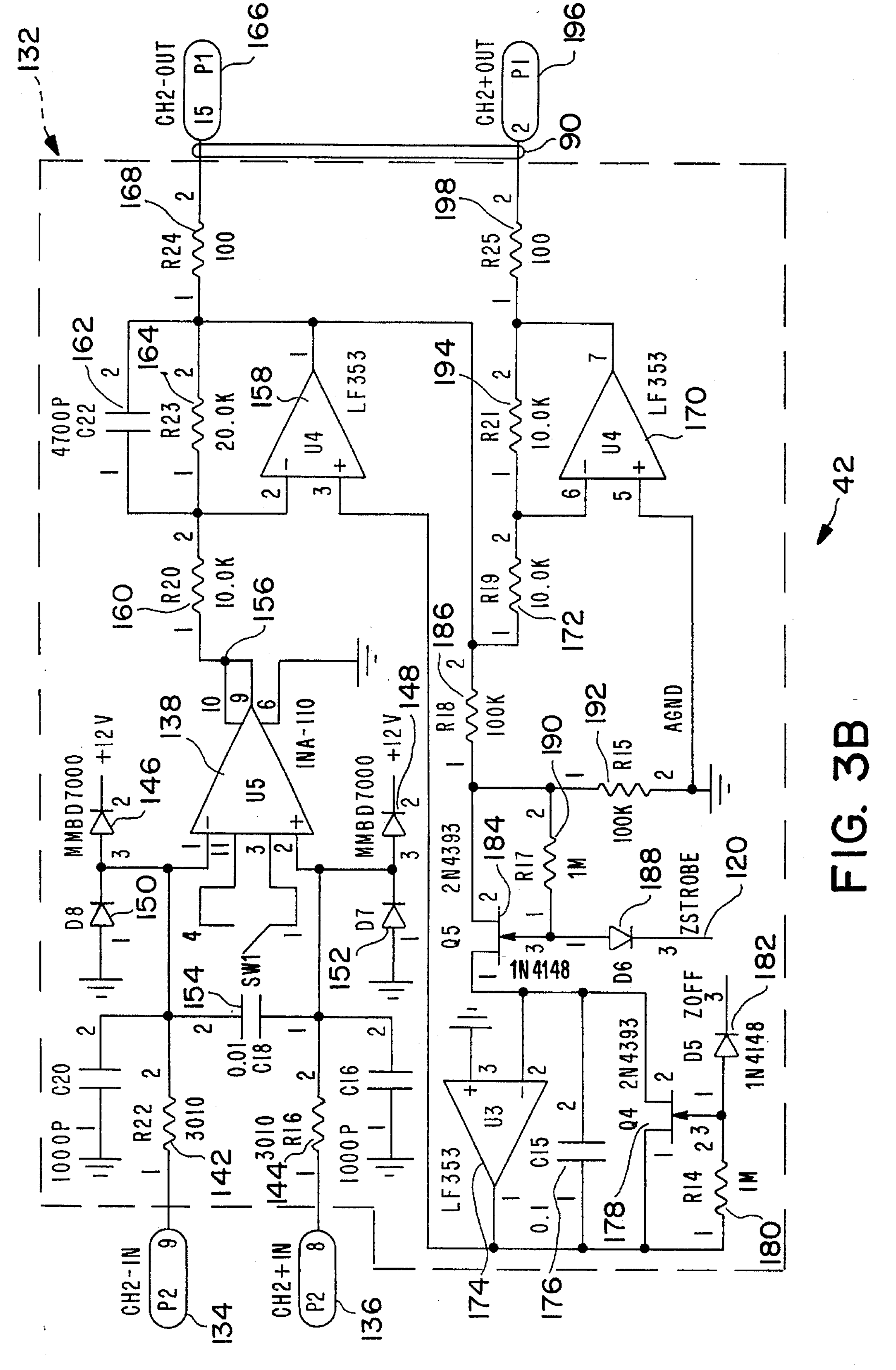
FIG. 3B is a schematic diagram of another instrumentation amplifier and automatic offset correction circuit configured in accordance with an embodiment of the present invention.

Referring to FIGS. 3A and 3B, FIGS. 3A and 3B is a schematic diagram of instrumentation amplifier and automatic offset correction circuit 42. Circuit 42 includes circuitry for two input channels 130 and 132, each associated with one of strain gauges 18. Of course, circuit 42 may include as many input channels as there are input transducers such as strain gauges 18. For example, for a given application, a press may require more than two strain gauges to properly monitor the loads in the press. Since the circuitry for channels 130 and 132 is the same, only the circuitry for channel 130 will be described in detail, where the components for both channels 130 and 132 are numbered with the same numbers, and the description is applicable to channel 132.

Strain gauges 18 are coupled to terminals 134 and 136, which are coupled to the inverting and non-inverting inputs of an instrumentation amplifier 138, respectively, by resistors 142 and 144, respectively. Diodes 146 and 148 conduct when inputs 134 or 136 rise above +12 volts, thus protecting the inputs of amplifier 138 from positive voltage transients. Diodes 150 and 152 conduct when inputs 134 or 136 fall below ground potential and thus protect the inputs of amplifier 138 from negative voltage transients. A capacitor 154 couples the inverting and non-inverting inputs of op amp 138 to filter the signal applied to these inputs. The gain select inputs (pins 11, 3) of amplifier 138 are connected to a switch 139 which, when closed, connects these inputs for the purpose of setting the gain of amplifier 138 to 500. The output reference pin 6 of amplifier 138 is connected to ground, and the outputs (pins 9, 10) of amplifier 138 are connected together to provide a non-differential output at a terminal 156. Terminal 156 is connected to the inverting input of an op amp 158 by a resistor 160. Op amp 158 is provided with power in the form of ±12 volts from power supply 41.

The output of op amp 158 is connected to the inverting input by the parallel arrangement of a capacitor 162 and resistor 164. This arrangement of capacitor 162, resistor 160, and resistor 164 provides filtering and a gain of 2 at op amp 158. Accordingly, the overall gain for circuit 42 is 1,000. The output of op amp 156 is also connected to an output terminal 166 by a resistor 168.

The output of op amp 158 is also connected to the inverting input of an op amp 170 by a resistor 172, and the source of transistor 184 by resistor 186. The non-inverting input of op amp 170 is coupled to ground. The output of op amp 170 is connected to an output terminal 196 by a resistor 198, and the inverting input by a resistor 194. This arrangement of op amp 170 and resistors 172 and 194, having equal resistances, provides an inventor which produces a signal at terminal 196 which is the complement of the signal at terminal 166. These complementary signals are applied to line receivers 44, and permit receivers 44 to reject common mode noise which may be introduced into data conductors 90.

The source of transistor 184 is also coupled to its gate by resistor 190, and ground by resistor 192. The drain of transistor 184 is coupled to the inverting input of op amp 174. The non-inverting input of op amp 174 is coupled to ground. The output of op amp 174 is coupled to the non-inverting input of op amp 158. Capacitor 176 couples the inverting input of op amp 174 to the output, such that op amp 174 operates as an integrator of the voltage at the output of op amp 158 when transistor 184 is conducting.

The gate of transistor 184 is coupled to offset correction control circuit 66 by a diode 188, which applies an offset correction signal (ZSTROBE, discussed in detail below) to the gate causing transistor 184 to conduct. Accordingly, a positive ZSTROBE signal causes integration of the output signal at op amp 158 so that the output at op amp 158 tends toward zero if transistor 184 is conducting, and the output of op amp 158 is not zero. Capacitor 176 maintains an offset voltage at the output of op amp 174, such that a signal applied to the inverting input of op amp 158 is offset. By way of example, the application of ZSTROBE may be timed to occur during a portion of a cycle of press 12 when the output of op amp 170 would ideally be zero, e.g., the strain gauge was ideal, thermal expansion and contraction are not present and circuit component values are not dependent upon aging and temperature. Since the strain gauges and circuit components are not ideal and press 12 may be exposed to residual stresses, the integration allows the output of op amp 158 to be corrected or offset to zero at a position in the cycle when the output should be zero.

A transistor 178 is coupled across capacitor 176 such that the voltage across capacitor 176 goes to zero when transistor 178 is conductive. When the voltage across capacitor 176 is zero, the voltage at the output of op amp 174 is zero and an offset voltage of zero volts is applied to op amp 158 such that the output of op amp 158 is not offset (corrected). It is desirable to eliminate an offset voltage at op amp 158 when the circuitry of controller 14 is being calibrated.

The source of transistor 178 is coupled to the gate of transistor 178 by resistor 180, where the gate is also coupled to offset correction control circuit 66 by a diode 182. Circuit 66 applies a calibration signal (ZOFF, discussed in detail below) to the gate such that transistor 182 is rendered conductive. Accordingly, a positive ZOFF signal eliminates an offset voltage at op amp 158 if ZSTROBE is negative.

Figure 4:
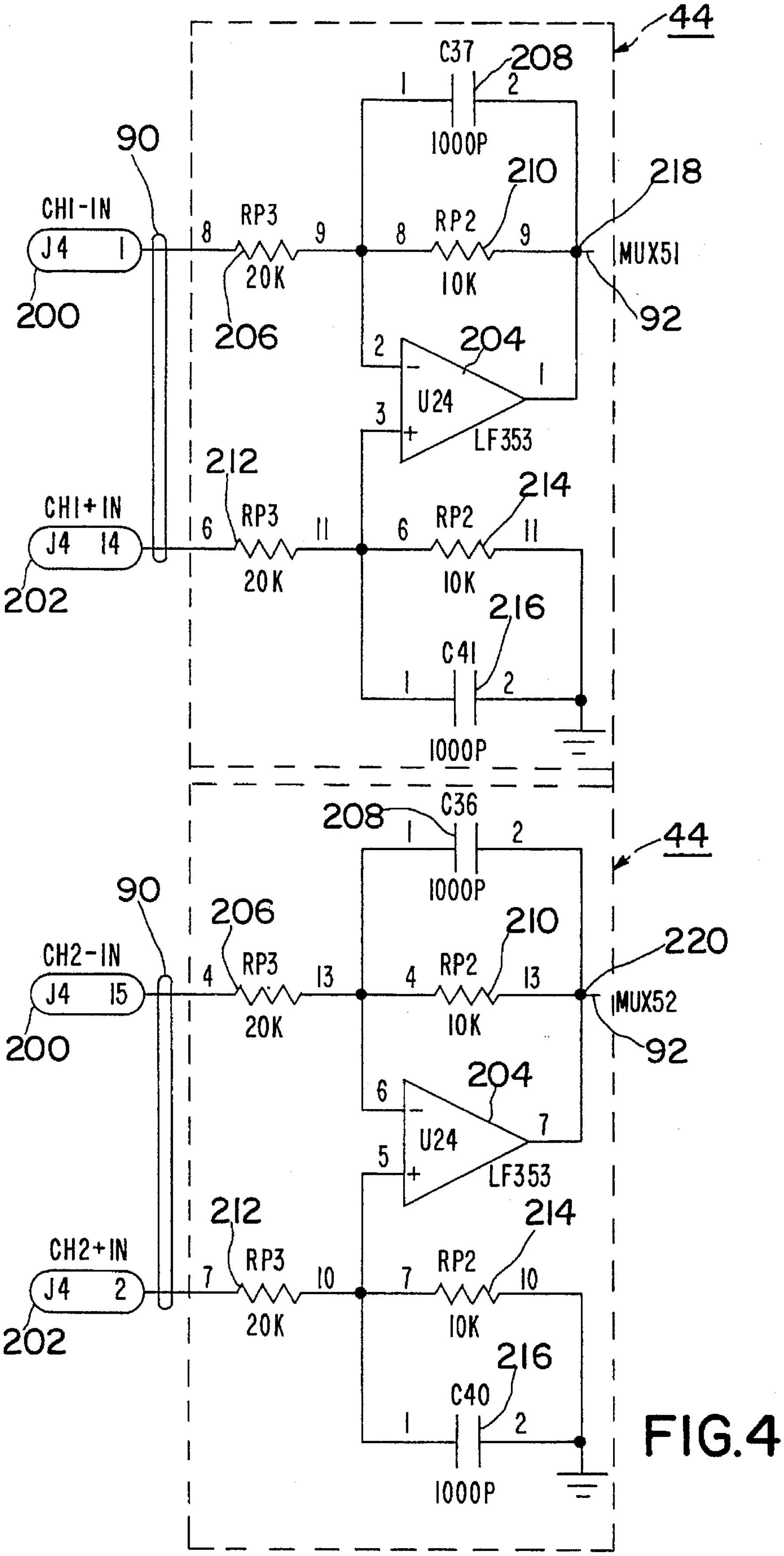
FIG. 4 is a circuit diagram for a pair of line receivers configured in accordance with an embodiment of the present invention.
Figure 5:
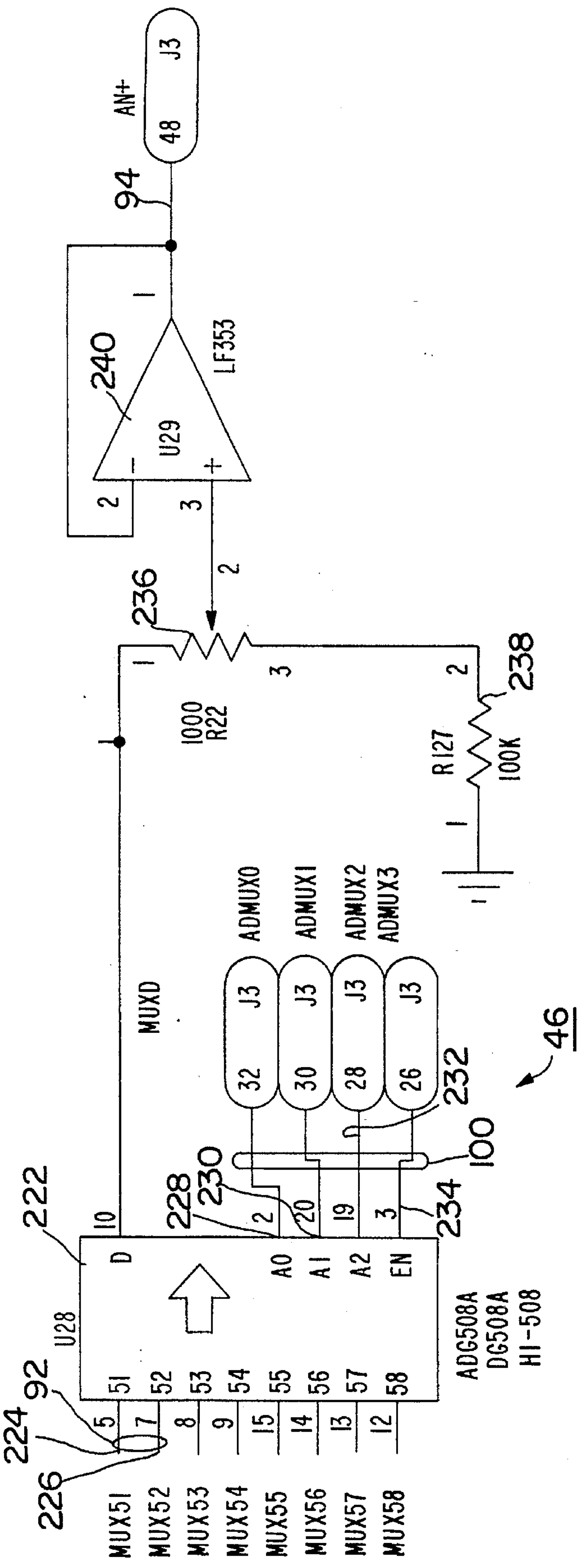
FIG. 5 is a circuit diagram for a multiplexer circuit configured in accordance with an embodiment of the present invention.

Output terminals 166 and 196 are coupled to input terminals 200 and 202 of line receivers 44, the circuitry for which is illustrated in FIG. 4. The circuitry for two line receivers 44 is illustrated in FIG. 4, where one line receiver is associated with one of input channels 130 and 132. Of course, more than two line receivers 44 may be utilized where a given application requires more than two input channels. Since the circuitry for line receivers 44 is the same, only the circuitry for one line receiver 44 will be described in detail, where the components for both line receivers 44 are numbered with the same numbers and the description is applicable to both line receivers 44.

Input terminal 200 is coupled to the inverting input of an op amp 204 by a resistor 206. The output of op amp 204 is coupled to the inverting input by the parallel arrangement of a capacitor 208 and a resistor 210. The arrangement of capacitor 208, resistor 210, and resistor 206 provides for filtering, and a gain of 0.5 at op amp 204. The non-inverting input of op amp 204 is coupled to input terminal 202 by a resistor 212, and coupled to ground by the parallel arrangement of a resistor 214 and a capacitor 216. Output terminals 218 and 220, which are connected to the respective outputs of op amps 204, are each connected to one channel of a multiplexer 222 illustrated in FIG. 5. The arrangement of line receivers 44 substantially eliminates common mode noise applied to terminals 200 and 202.

Figure 12:
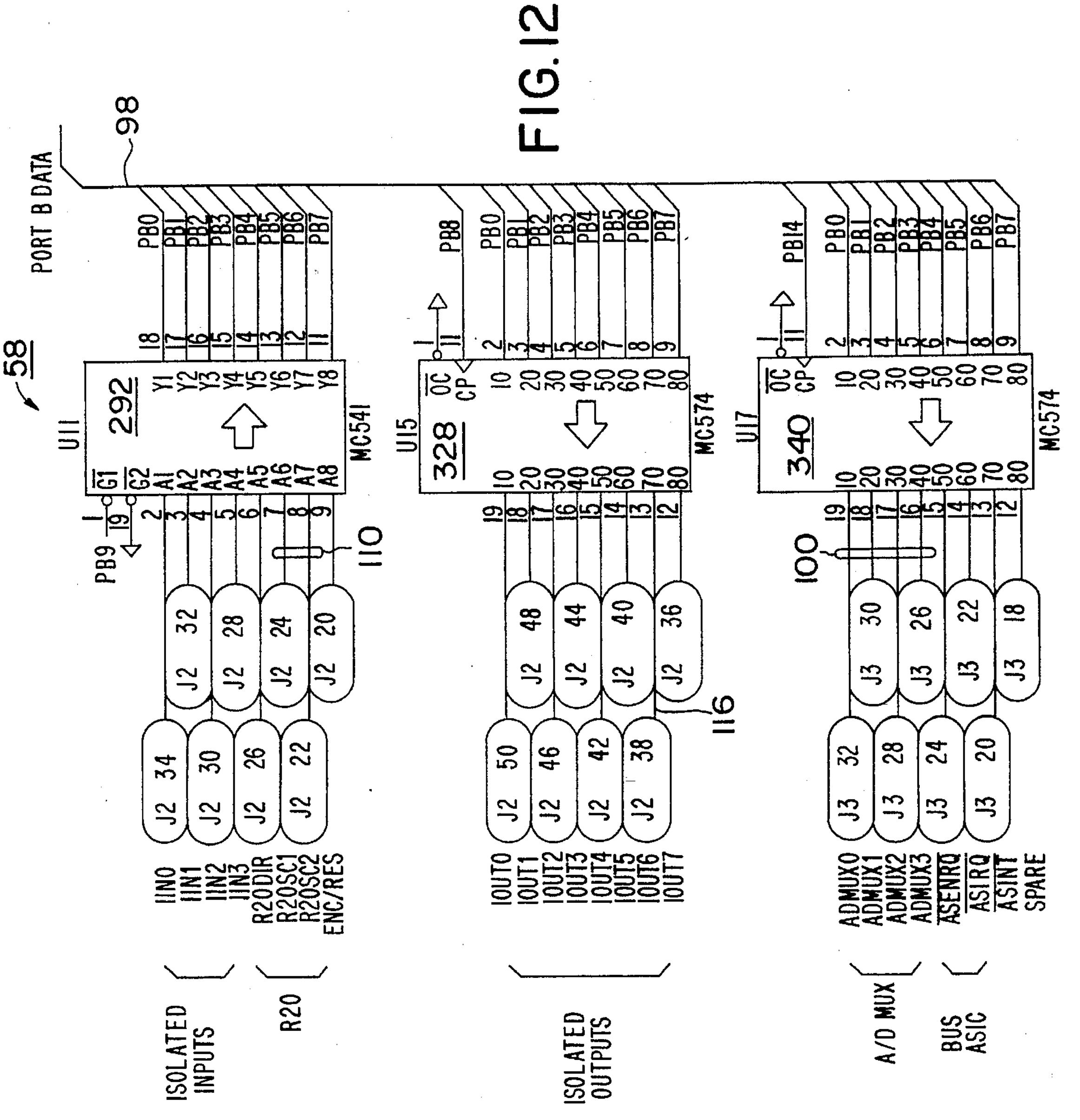
FIG. 12 is a circuit diagram for a buffer circuit configured in accordance with the present invention.

Output terminal 218 is coupled to input terminal 224 of multiplexer 222, and output terminal 220 is coupled to input terminal 226 of multiplexer 222. Address lines 228, 230 and 232, and enable line 234 of multiplexer 222 are coupled to data bus 100 which is coupled to port B buffer 58 (FIG. 12). The output line of multiplexer 222 is coupled to ground by a potentiometer 236 arranged in series with a resistor 238. The tap of potentiometer 236 is coupled to the non-inverting input of an op amp 240. Potentiometer 236 allows calibration of the output signal applied to analog-to-digital converter 242 via data conductor 94. Op amp 240 provides buffering for multiplexer 222 and outputs a voltage in the range of 5 volts to the input of an analog-to-digital converter 242.

Figure 6:
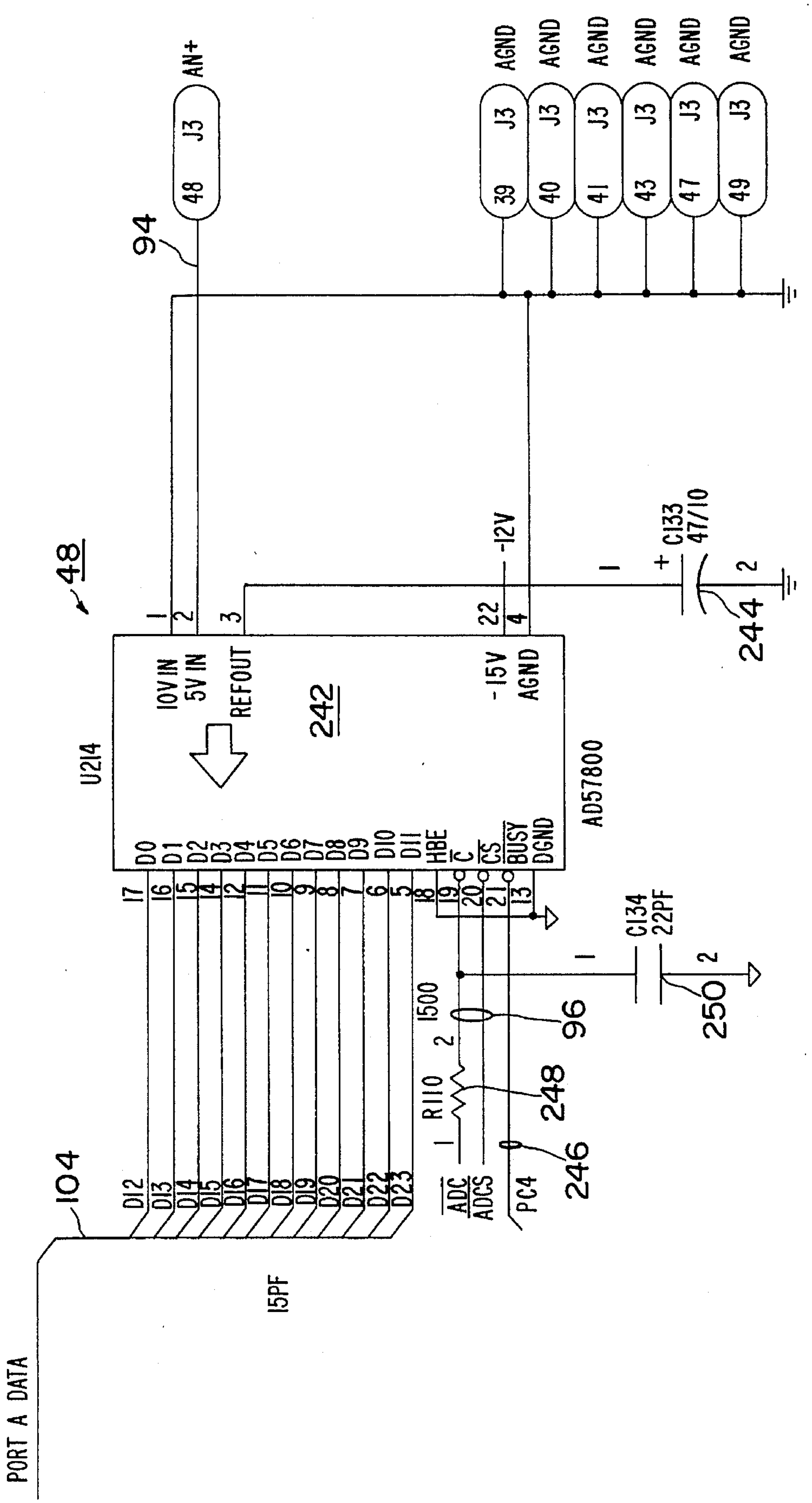
FIG. 6 is the circuit diagram for an analog-to-digital converter circuit configured in accordance with the present invention.
Figure 9:
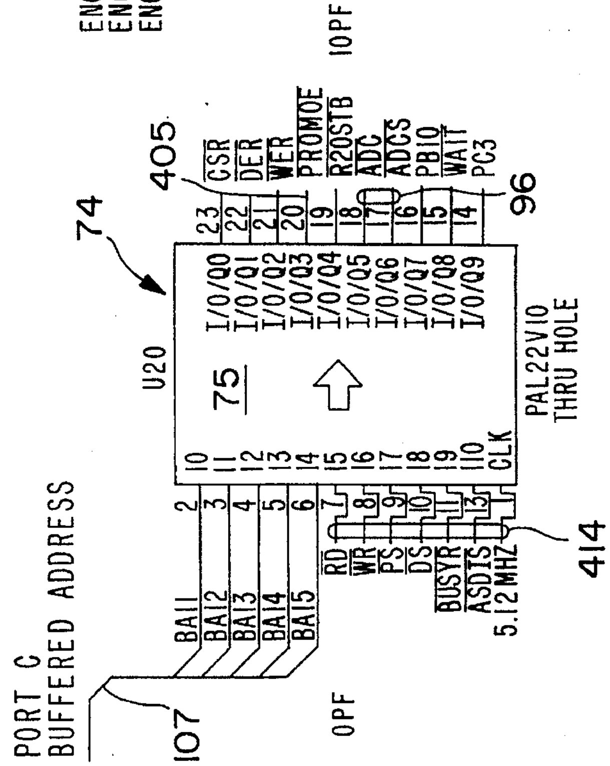
FIG. 9 is a PAL (programmable array logic) configured in accordance with the present invention.

Referring to FIG. 6, FIG. 6 illustrates the analog-to-digital converter circuit 48. Analog-to-digital converter 242 is provided power at +5 volts and −12 volts by power supply 76 which is a conventional power supply capable of providing a +5 volt supply for digital logic and a ±12 volts for analog circuitry. Analog-to-digital converter 242 is coupled to and referenced to ground by a capacitor 244. Data line 94 is connected to the 5 volt input of analog-to-digital converter 242, and the 10 volt input is grounded. Analog-to-digital converter 242 converts the analog signal at the 5 volt input to a 12-bit digital signal applied to data bus 104 which couples analog-to-digital converter 242 to DSP circuit 50 (FIG. 16). Data line 246 couples the busy line of analog-to-digital converter 242 to the ADC busy terminal of DSP circuit 50 (FIG. 16). The convert and chip select terminals of analog-to-digital converter 242 are connected to strobe 74 by data bus 96 (FIG. 9). The convert terminal of analog-to-digital converter 242 is coupled to strobe 74 by a resistor 248 and also coupled to ground by a capacitor 250 to delay the onset of the convert pulse slightly with respect to the onset of the chip select pulse.

Resolver 16 is a conventional resolver to which a 2.5 kHz sine wave is applied. The 2.5 kHz sine wave is produced by resolver excitation circuit 52 which may be a conventional circuit for producing a 2.5 kHz sine wave. The 2.5 kHz sine wave is also applied to a reference in terminal 106 of a resolver-to-digital converter 252 of resolver-to-digital converter circuit 54.

Figure 7:
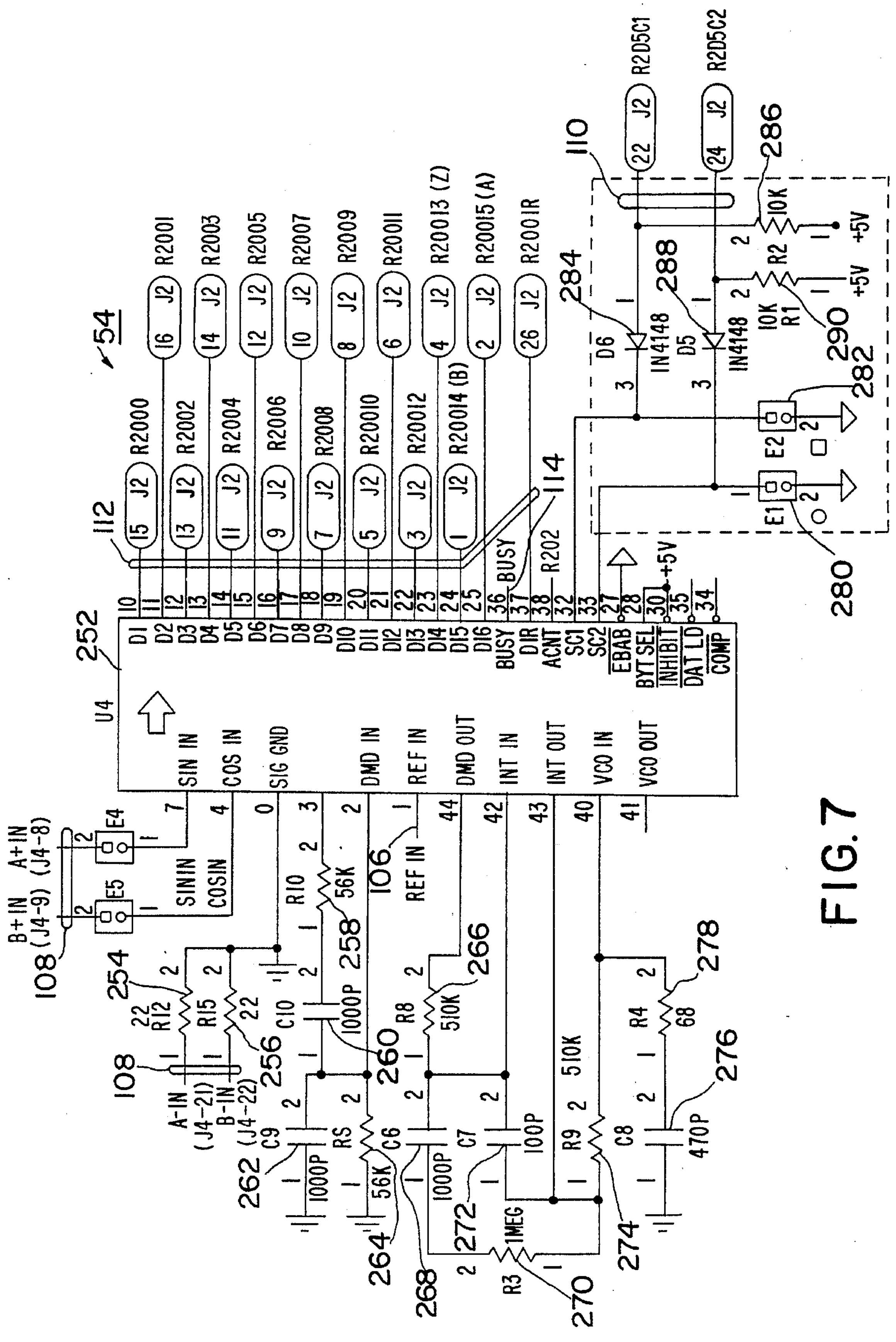
FIG. 7 is a circuit diagram for a resolver-to-digital converter circuit configured in accordance with an embodiment of the present invention.

Referring to FIG. 7, FIG. 7 is a circuit diagram for the resolver-to-digital converter circuit 54. The sine and cosine signals from resolver 16 are connected to the sine in and cosine in terminals of converter 252 via signal bus 108, and the return lines of the sine and cosine signals of resolver 16 are coupled to the signal ground of converter 252 by a pair of resistors 254 and 256 which are coupled to signal bus 108. The signal ground terminal of converter 252 is also connected to ground at the point where resistors 254 and 256 are connected to the signal ground of converter 252. The error out terminal of converter 252 is coupled to ground by the series arrangement of a resistor 258, a capacitor 260, and the parallel arrangement of a capacitor 262 and a resistor 264. The DMD IN terminal of converter 252 is coupled to the error out terminal by the series arrangement of resistor 258, and capacitor 260. The DMD OUT terminal of converter 252 is connected to the INT IN terminal by a resistor 266, where the INT IN terminal is also connected to the INT OUT terminal by a capacitor 268 and resistor 270 arranged in parallel with a capacitor 272. The INT OUT terminal is coupled to the VCO IN terminal by a resistor 274, where the VCO IN terminal is also coupled to ground by the series arrangement of a capacitor 276 and a resistor 278. The arrangement of components 258–278 and their connection to converter 252 is suggested by the manufacturer of converter 252, which is Analog Devices.

Converter 252 is of the type where the resolution of the converter may be selected such that either 15, 12, 14 or 16 bits of resolution/resolver revolution may be provided. To select the resolution of converter 252, the appropriate logic is applied to terminals SC1 and SC2 of converter 252. More specifically, the logic provided to terminals SC1 and SC2 may be selectively provided by tying the appropriate combination of SC1 and SC2 to ground via jumpers 280 and 282. By way of modification, the resolution of converter 252 could be selected by DSP circuit 50, where jumpers 280 and 282 are replaced by appropriate switches controlled by DSP circuit 50 via an isolated output of port B buffer 58.

Terminals SC1 and SC2 are connected to the +5 volt source of power supply 76 by the series arrangement of diode 284 and resistor 286, and diode 288 and resistor 290, respectively. The cathodes of diodes 284 and 288 are connected to their respective terminal SC1 and SC2. The anodes of diodes 284 and 288, in addition to being connected to resistors 286 and 290, respectively, are connected to terminals J2 22 and J2 24 of buffer 292 in port B buffer 58 (FIG. 12) by data bus 110. The status of SC1 and SC2 provide circuit 50 with the resolution at which converter 252 is operating.

The digital value representative of the absolute rotational position of resolver 16 is provided in parallel form at terminals D1–D16 of converter 252. Terminals J2-1 to J2-16 of converter 252 are connected to terminals J2-1 to J2-16 of buffers 294 and 296 which make up resolver buffer 56 illustrated in FIG. 8. The busy terminal of resolver 252 is coupled to the interrupts of DSP circuit 50 (IRQA and IRQB) by data line 114 and a buffer 416 (FIG. 16).

Figure 8:
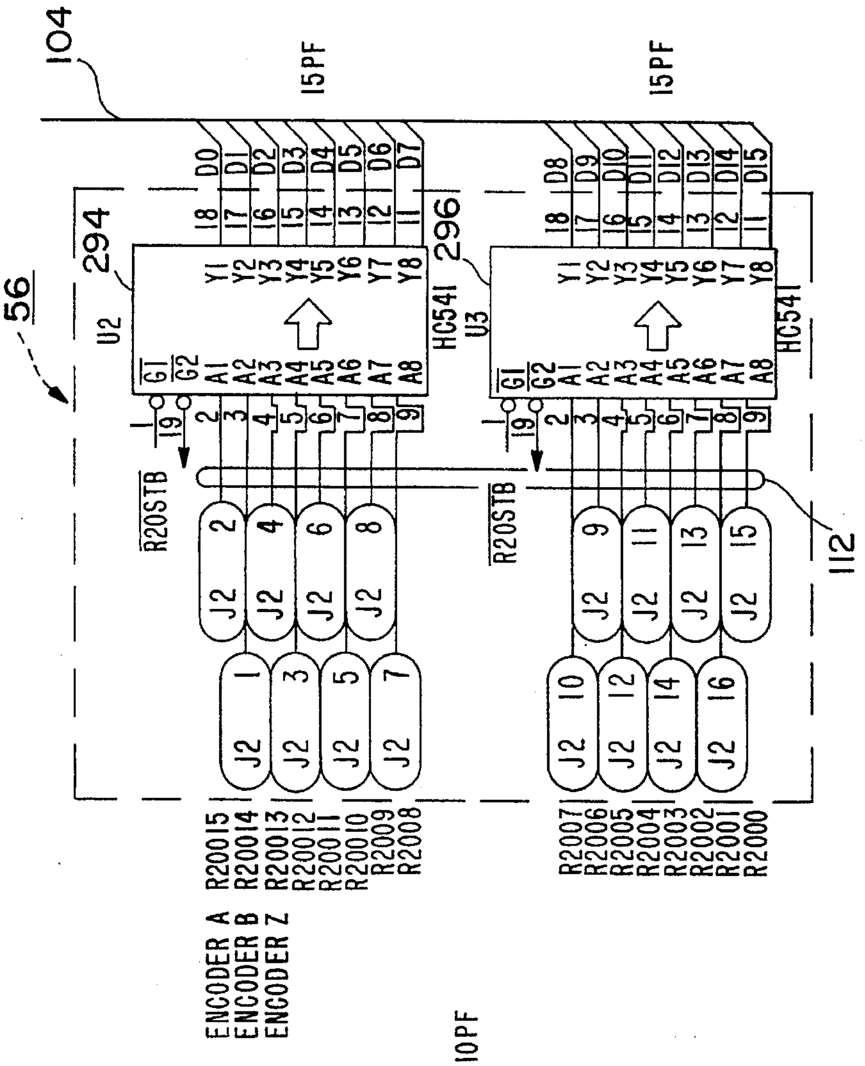
FIG. 8 is a resolver buffer configured in accordance with an embodiment of the present invention.
Figure 15A:
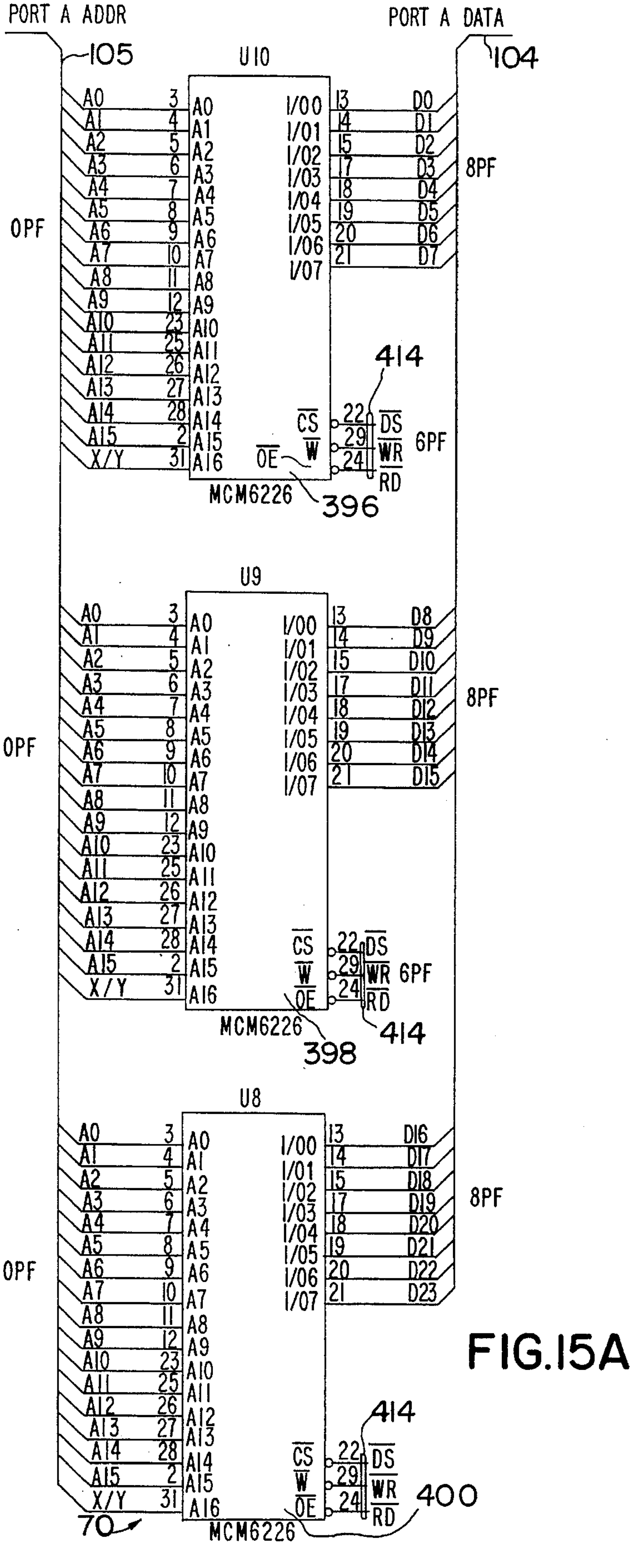
FIG. 15 is a configuration of RAM and PROM configured in accordance with an embodiment of the present invention.
Figure 15B:
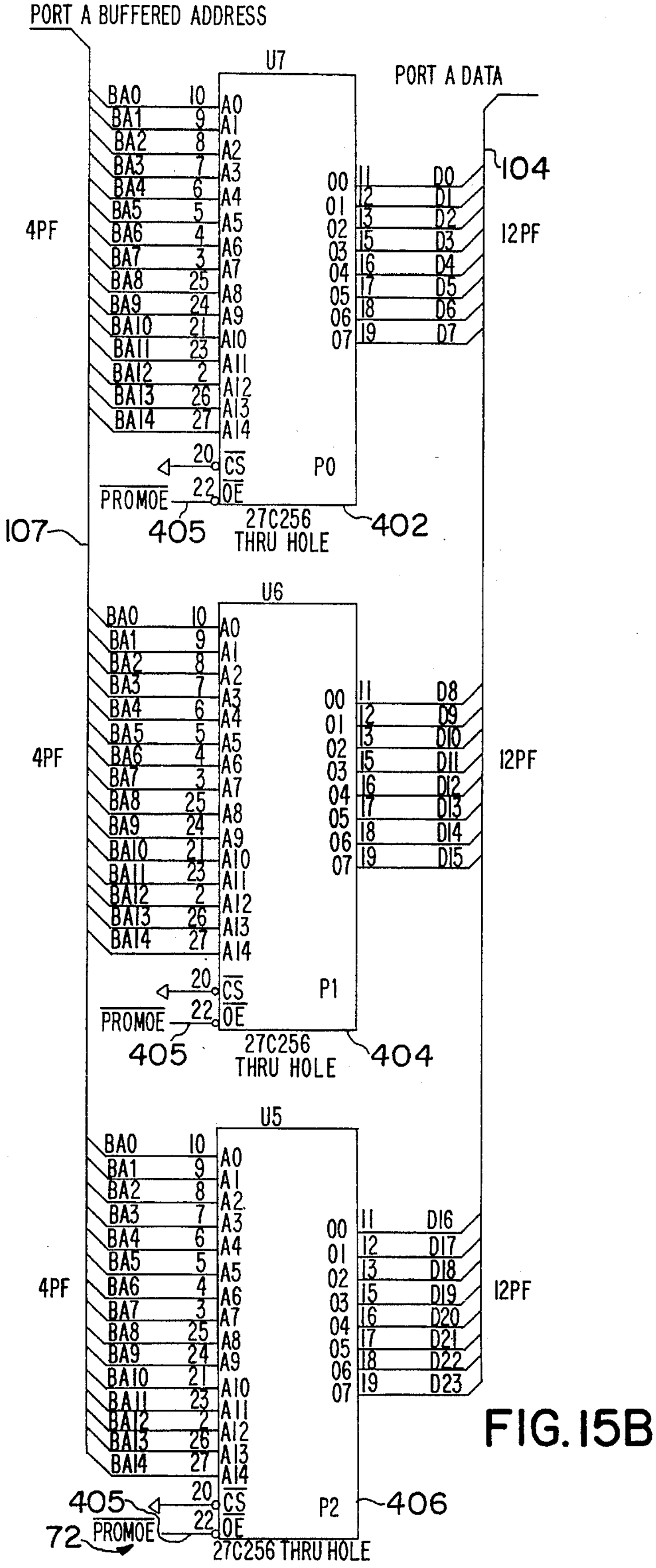

Referring to FIG. 8, resolver buffer 56 includes two 8-bit buffers 294 and 296 which buffer the digital signal representative of absolute resolver angle produced by converter 252. The signal is applied to data bus 104, which is coupled to DSP circuit 50 (FIG. 15).

FIG. 9 is the circuit diagram for strobe generator 74. Generator 74 includes a PAL 75 coupled to buffered address bus 107 and a control bus 414 which is coupled to DSP circuit 50 (FIG. 16). PAL 75 outputs various control signals, including a PROM enable signal, and converter 242 convert and chip select signals on data bus 96, in response to the signals applied to data buses 107 and 414.

Figure 10:
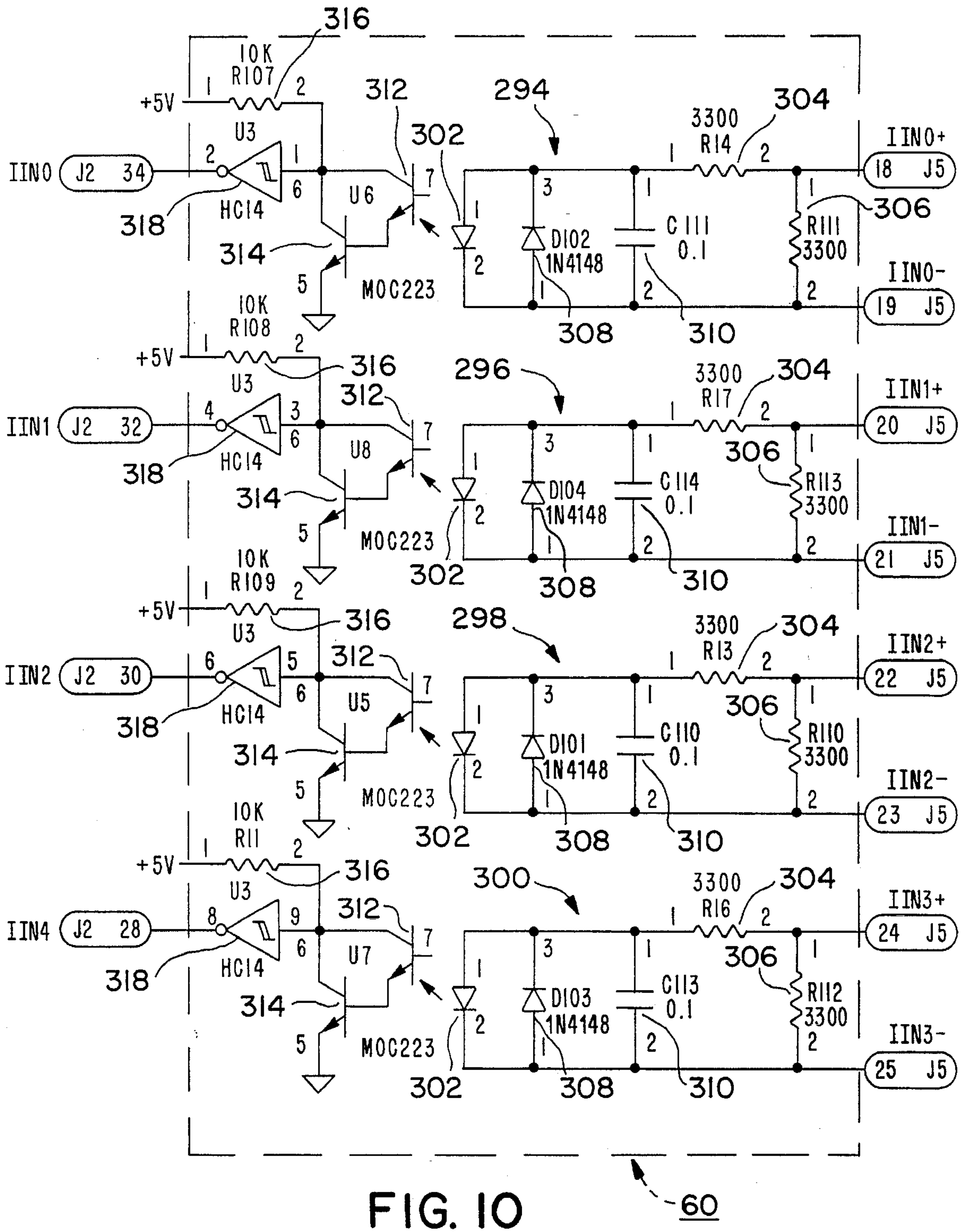
FIG. 10 is a circuit diagram for a digital input circuit configured in accordance with an embodiment of the present invention.

Referring to FIG. 10, FIG. 10 is a circuit diagram of digital input circuit 60. Circuit 60 includes circuitry for 4 input channels 294, 296, 298 and 300. Of course, circuit 60 may be modified to include as many input channels as required for a particular application. Since the circuitry for channels 294, 296, 298 and 300 is the same, only the circuitry for channel 294 will be described in detail, where the components for all channels are numbered with the same numbers and the description is applicable for channels 296, 298 and 300.

Channel 294 includes input terminals J5-18 and J5-19 which may be coupled to an input device such as a push button or relay. Terminal J5-18 is coupled to the anode of a light-emitting diode 302 by a resistor 304, and terminal J5-19 is coupled to the cathode of light-emitting diode 302. Terminals J5-18 and J5-19 are coupled to each other by a resistor 306. The parallel arrangement of a diode 308 and capacitor 310 is connected across the light-emitting diode 302 with the anode of diode 308 connected to the cathode of diode 302, and the cathode of diode 308 connected to the anode of diode 302. The light emitted by diode 302 is applied to a photo transistor 312 having its emitter connected to the base of a transistor 314, where the emitter of transistor 314 is connected to ground. The collectors of photo transistor 312 and transistor 314 are connected to the 5 volt supply of power supply 61 by a resistor 316, and also connected to the input of an inventor 318 having its output connected to output terminal J2-34.

Outputs J2-34, J2-32, J2-30 and J2-28 are connected to the corresponding inputs of buffer 292 in port B buffer 58 (FIG. 12). The arrangement of photo diodes 302 and photo transistors 312 provides optical isolation between input terminals J5-18 to J5-25 and output terminals J2-34 to J2-28. The outputs of channels 294, 296, 298 and 300 are buffered by buffer 292 and applied to DSP circuit 50 via data bus 98.

Figure 11:
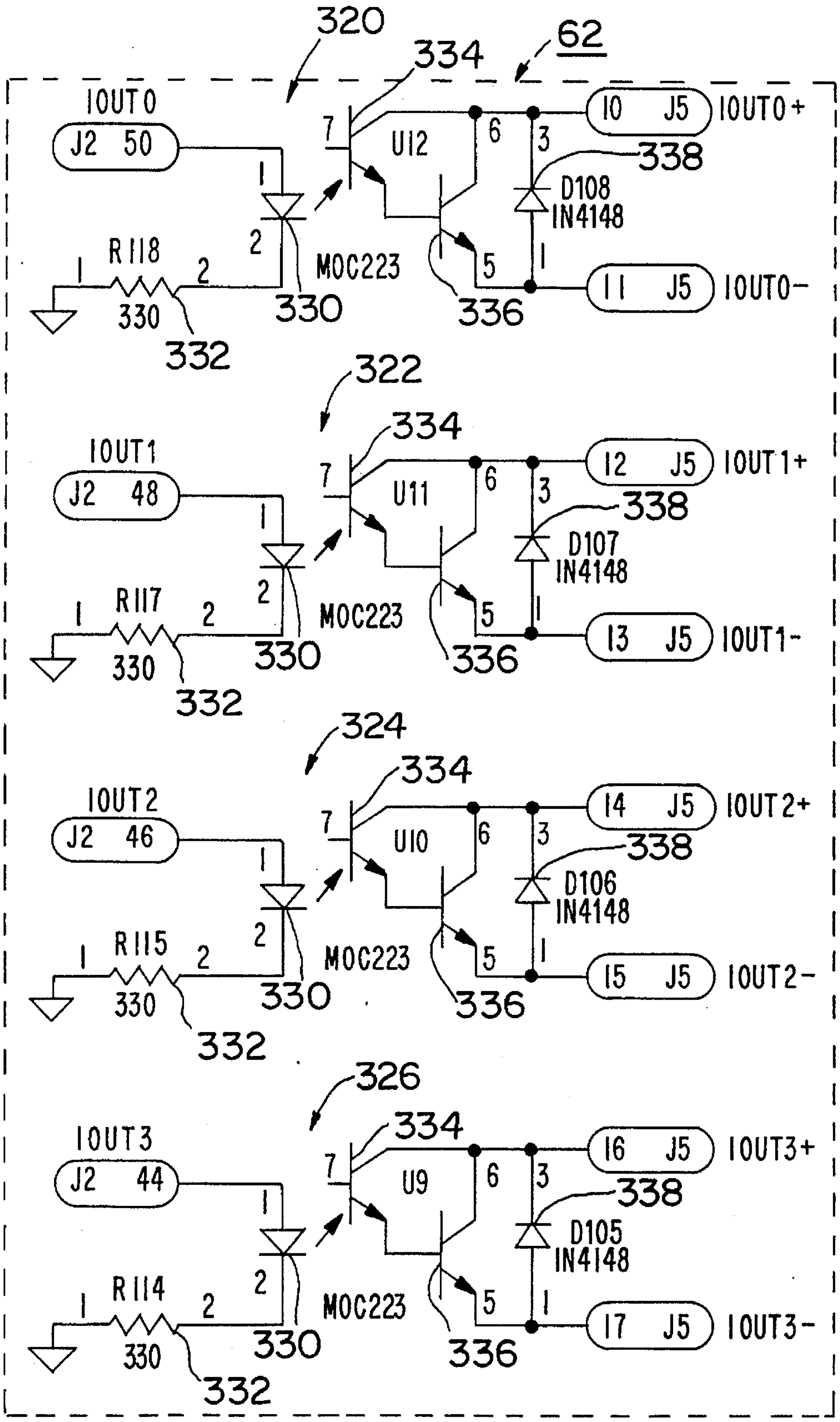
FIG. 11 is a circuit diagram for a digital output circuit configured in accordance with the present invention.

Referring to FIG. 11, FIG. 11 illustrates the circuit diagram for digital output circuit 62. Circuit 62 may include from 1 to 8 isolated output channels, where FIG. 11 illustrates the circuits for four channels 320, 322, 324 and 326. Each of channels 320, 322, 324 and 326 may be coupled to control devices such as relays for turning on and off a press, relays for controlling product rejection apparatus, or controlling indicating devices, such as LEDs which may include warning and control lights on an operator display panel. Since the circuitry for channels 320, 322, 324 and 326 is the same, only the circuitry for channel 320 will be described in detail, where the components for all channels are numbered with the same numbers and the description for channel 320 is applicable to channels 322, 324 and 326.

Channel 320 includes an input terminal J2-50 which is coupled to an 8-bit register 328 of port B buffer 58 (FIG. 12). DSP circuit 50 provides a signal to terminal J2-50 via register 328 over data bus 98. Likewise, DSP circuit 50 provides output signals to input terminals J2-48, J2-46 and J2-44 of channels 322, 324 and 326, respectively. Input terminal J2-50 is also coupled to ground by a light-emitting diode 330 connected in series with a resistor 332. When a signal is provided by DSP 50 to terminal J2-50, the light from light-emitting diode 350 is applied to photo transistor 334. The collector of photo transistor 334 is coupled to an output terminal J5-10, and the emitter of photo transistor 334 is connected to the base of a transistor 336. The collector of transistor 336 is connected to output terminal J5-10 and the emitter of transistor 336 is coupled to an output terminal J5-11. Output terminals J5-10 and J5-11 are connected together by a diode 338 having its cathode connected to terminal J5-10. Transistor 336 serves to amplify the signal from photo transistor 334.

Referring to FIG. 12, FIG. 12 is a circuit diagram for port B buffer 58. Portions of this circuit diagram have been discussed above in conjunction with other portions of the circuitry for process controller 14. In addition to buffer 292 and register 328, port B buffer circuit 58 also includes an 8-bit register 340. Register 340 buffers the address signal from DSP circuit 50 which selects the address of multiplexer 222. As with buffer 292 and register 328, register 340 is coupled to DSP circuit 50 by data bus 98.

Figure 13:
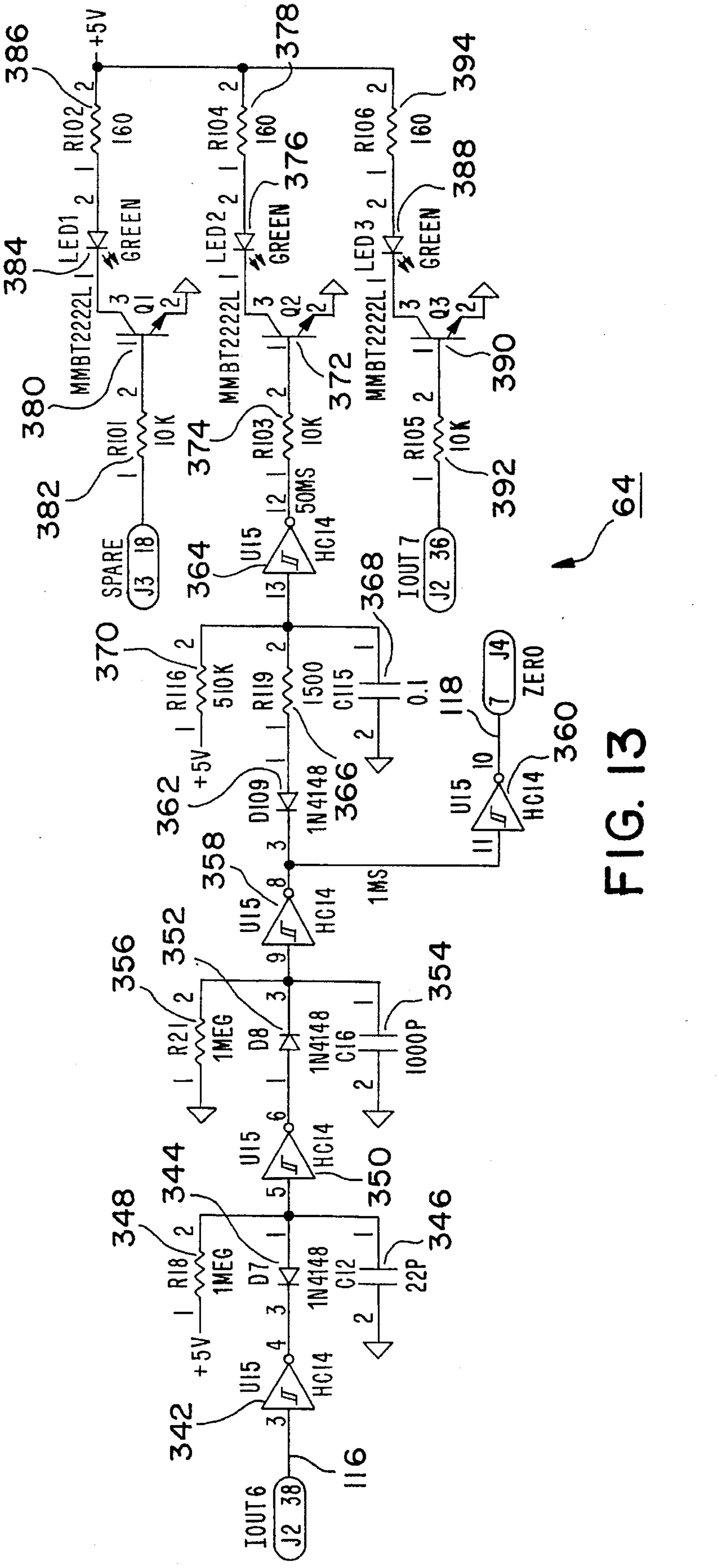
FIG. 13 is a circuit diagram for an offset correction driver circuit configured in accordance with the present invention.

Referring to FIG. 13, FIG. 13 illustrates offset correction driver circuit 64. Circuit 64 is coupled to register 328 (FIG. 12) of port B buffer 58 at terminal J2 38 via data line 116. Register 328 serves to buffer an offset correction pulse from DSP circuit 50 which is provided over data bus 98 to register 328. As discussed above, circuit 64 serves to increase the duration of the pulse from circuit 50 from approximately 200 nanoseconds to 10 milliseconds.

Terminal J2 38 is coupled to an inventor 342 which is coupled to the cathode of a diode 344. The anode of diode 344 is coupled to ground by a capacitor 346, coupled to the +5 volt source of power supply 41 by a resistor 348, and coupled to the input of an inventor 350. The output of inventor 350 is coupled to the anode of a diode 352, where the cathode of diode 352 is coupled to ground by a capacitor 354. The cathode of diode 352 is also coupled to ground by a resistor 356, and coupled to the input of an inventor 358. The output of inventor 358 is coupled to the input of inventor 360, and coupled to the cathode of a diode 362. The output of inventor 360 applies the offset connection pulse (Z) to offset connection circuit 66 over data line 118.

The anode of diode 362 is coupled to the input of an inventor 364 by a resistor 366. The input of inventor 364 is coupled to ground by a capacitor 368 and coupled to the 5 volt source of power supply 41 by a resistor 370. The output of inventor 364 is coupled to the base of a transistor 372 by a resistor 374. The emitter of transistor 372 is connected to ground, and the collector of transistor 372 is connected to the cathode of an LED 376 having its anode connected to the 5 volt supply by a resistor 378. Accordingly, when an offset correction pulse is applied to circuit 64, circuit 64 will increase the duration of the pulse for enough time to drive circuit 66 via line 118 and illuminate LED 376 via transistor 372.

Circuit 64 also includes a terminal J3 18 which is coupled to terminal J3 18 of register 340 (FIG. 12). A pulse from DSP circuit 50 transmitted over data bus 98 to register 340 may be applied to terminal J3 18 via register 340. Terminal J3 18 is coupled to the base of transistor 380 by a resistor 382. The emitter of transistor 380 is connected to ground and the collector of transistor 380 is connected to the cathode of an LED 384 having its anode connected to the 5 volt source by a resistor 386. Accordingly, when a pulse is applied to terminal J3 18, LED 384 is illuminated.

Terminal J2 36 is coupled to terminal J2 36 of register 328 such that when a pulse is provided to register 328 by DSP circuit 50 over data bus 98, an LED 388 may be illuminated. More specifically, terminal J2 36 is coupled to the base of a transistor 390 by a resistor 392. The emitter of transistor 390 is connected to ground and the collector is connected to the cathode of LED 388. The anode of LED 388 is coupled to the 5 volt source by a resistor 394. LEDs 384 and 388 may be illuminated by DSP circuit 50 to provide user feedback such as a warning.

Figure 14:
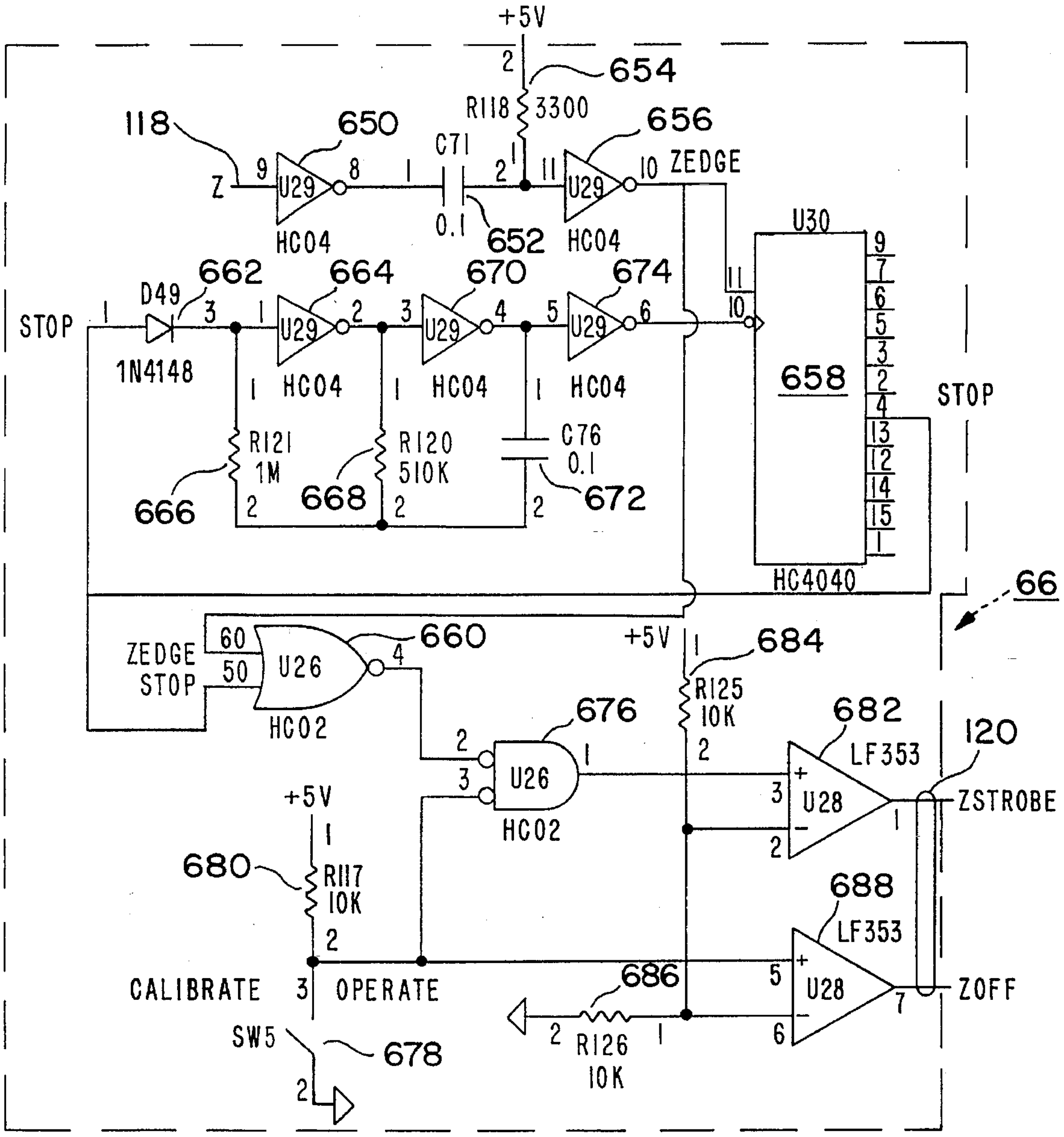
FIG. 14 is a circuit diagram for an offset correction control circuit configured in accordance with an embodiment of the present invention.

Referring to FIG. 14, FIG. 14 illustrates the offset correction control circuit 66. Circuit 66 produces the offset correction signal (ZSTROBE) and the calibration signal (ZOFF) applied to instrumentation amplifier and automatic offset correction circuit 42 via signal bus 120. The ZSTROBE and ZOFF signals are applied to diodes 188 and diodes 182 of circuit 42, respectively. The ZSTROBE signal is a pulse going from −12 volts to +12 volts, with a duration of 10 milliseconds, and the ZOFF signal is either +12 volts or −12 volts.

The offset correction pulse (Z) from offset correction circuit 64 is a positive pulse applied to an invertor 650 via data line 118. The output of invertor 650 is coupled to the +5 volt source of power supply 41 by a capacitor 652 arranged in series with a resistor 654. The junction between capacitor 652 and resistor 654 is coupled to an invertor 656. The output of invertor 656 is coupled to the reset pin of a counter 658 and one input of a NOR gate 660. When a positive 5 volt Z signal is applied to invertor 650, a ZEDGE signal of 5 volts is applied to the reset pin of counter 658 and NOR gate 660.

The clock input pin of counter 658 is coupled to a circuit which oscillates at approximately 10 Hz. The circuit includes a diode 662 having its anode coupled to the output (STOP) of counter 658 which goes low at about 128 counts and disables the oscillator circuit. The cathode of diode 662 is coupled to the input of an invertor 664 and coupled to the output of invertor 664 by a series arrangement of a pair of resistors 666 and 668.

The output of invertor 664 is also coupled to the input of an invertor 670 and the output of invertor 670 by resistor 668 in series with a capacitor 672. The output of invertor 670 is coupled to the input of an invertor 674 having its output coupled to the clock input of counter 658.

The STOP output of counter 658 is coupled to the second input of NOR gate 660. The output of NOR gate 660 is coupled to one input of AND gate 676. The second input of AND gate 676 is coupled to ground by a normally open switch 678, and the 5 volt source of supply 41 by a resistor 680. The output of AND gate 676 is coupled to the non-inverting input of an op amp 682 coupled to the _12 volt source of supply 41.

The inverting input of op amp 682 is coupled to the 5 volt source by a resistor 684, to ground by a resistor 686, and an op amp 688. Op amp 688 is coupled to the _12 volt source. The output of op amp 682 applies the ZSTROBE signal to diodes 188 of circuit 42 via signal bus 120, and op amp 688 applies the ZOFF signal to diodes 182 of circuit 42 via signal bus 120.

The following status tables illustrate the operation of circuit 66:

| Z | ZEDGE |
|---|---|
| 0 | 0 |
| 0 to 5 | +5 pulse |

| ZEDGE | STOP (PULSE) | NOR 660OUT |
|---|---|---|
| 0 | 0 RUN | 5 |
| 5 | 0 RUN | 0 |
| 0 | 5 STOP | 0 |
| 5 | 5 STOP | 0 |

| NOR 660OUT | SWITCH 678 | AND 676OUT | OPAMP682 | OPAMP688 |
|---|---|---|---|---|
| 0 | OPEN (5) | 0 | −12 | +12 |
| 5 | OPEN (5) | 0 | −12 | +12 |
| 0 | CLOSED (0) | 5 | +12 | −12 |
| 5 | CLOSED (0) | 0 | −12 | −12 |

When press 12 is operating, a Z signal is produced at a selected position in the cycle where it is preferable to provide appropriate offset as discussed above. When Z goes from 0 to 5 volts and switch 678 is closed, a 5 volt ZEDGE pulse is produced which results in about a +12 volt ZSTROBE signal which causes integration at op amp 174 (FIG. 3B) as discussed above in reference to circuit 42. When ZEDGE and STOP are both 0 and switch 678 is closed, −12 volt ZSTROBE and ZOFF signals are applied to circuit 42 to terminate integration.

When the press 12 is stopped for a period of time, the zero signal will be applied constantly to the integrators in order to force the output signals from 41 to zero volts. More specifically, counter 658 will produce a STOP signal within about 10 seconds if a ZEDGE (ZEDGE ultimately results from the rotation of resolver 16) does not occur. If switch 678 is closed then op amp 682 will produce a ZSTROBE signal of +12 volts.

When switch 678 is open, ZSTROBE is about −12 volts and ZOFF is about +12 volts regardless of the status of ZEDGE and STOP. Accordingly, controller 14 may be calibrated since integration by op amps 174 is inhibited, and op amps 174 do not produce an offset voltage since the voltage across capacitors 176 is zero, i.e., transistors 178 are conducting.

Referring to FIG. 15, FIG. 15 illustrates the arrangement of RAM 70 and PROM 72. RAM 70 includes three RAM chips 396, 398 and 400 which are each 128 K×8-bit memory chips. Memory chips 396, 398 and 400 are addressed via address bus 105, which is coupled to DSP circuit 50. Address bus 105 is a 16-bit address bus. Memory chips 396, 398 and 400 are also coupled to data bus 104 which is coupled to DSP circuit 50. Data bus 104 is a 24-bit bidirectional data bus. RAM chips 396, 398 and 400 provide storage for the data from analog-to-digital converter 48 representative of the strain (also representative of stress and force) at strain gauges 18, data representative of the absolute rotational position of resolver 16 (related to the rotational position of press 12) provided by resolver-to-digital converter circuit 58 via resolver buffer 56, and data used by DSP circuit 50 for purposes of executing a program for monitoring and controlling press 12 ("the PROGRAM") (discussed in detail below). In particular, the data representative of force and absolute position may be stored as force/position signature data arrays.

The DS, write (WR) and read (OE) lines of chips 396, 398 and 400 are coupled to DSP circuit 50 (FIG. 16) by data bus 414.

PROM 72 arrangement includes three PROM chips 402, 404 and 406. PROMs 402, 404 and 406 are 32 K×8-bit PROMs. PROMs 402, 404 and 406 are coupled to a buffered address bus 107 which is coupled to DSP circuit 50. PROM chips 402, 404 and 406 are also coupled to port A data bus 104. PROMs 402, 404 and 406 provide permanent storage for the PROGRAM executed by DSP circuit 50. The PROM enable lines (PROMOE) of PROMs 402, 404 and 406 are coupled to PAL 75 by data lines 405.

Referring to FIG. 16, FIG. 16 illustrates DSP circuit 50. Circuit 50 includes a digital signal processor 408, and 8-bit address buffer 410, an 8-bit address buffer 412 and a buffer 416. In general, processor 408 accesses data from RAM chips 396, 398 and 400, and PROM chips 402, 404 and 406 over data bus 104. By way of example only, processor 408 may be a DSP 56001 processor manufactured by Motorola. The data from RAM chips 396, 398 and 400 is addressed by processor 408 over address bus 105, where the data from PROM chips 402, 404 and 406 is addressed by processor 408 via buffered address bus 107, which is coupled to address bus 105 by buffers 410 and 412. Buffers 410 and 412 buffer the addressing data from processor 408 in order to reduce the capacitive loading on address bus 105.

Port B of processor 408 is coupled to buffer 292, and registers 328 and 340 by bidirectional data bus 98. Data bus 98 carries data transferred between DSP circuit and port B buffer 58. As discussed above, buffer 58 is coupled to multiplexer 46, resolver-to-digital converter 54, digital inputs 60 and digital outputs 62, as discussed above. Processor 408 includes a control data port coupled to a control bus 414. Control bus 414 is coupled to RAM 70 (FIG. 15) and strobe 74 (FIG. 9). Bus 98 is coupled to port B buffer 58.

The following Table A lists the components of controller 14 and associated descriptions.

TABLE A

| Component | Description |
|---|---|
| 75 | PAL PAL22V10 |
| 138 | Burr Brown INA-110 |
| 142 | Resistor 1500 ohm |
| 144 | Resistor 1500 ohm |
| 146 | Diode MMDB7000 |
| 148 | Diode MMDB7000 |
| 149 | Capacitor 100 pf |
| 150 | Diode MMDB7000 |
| 151 | Capacitor 1000 pf |
| 152 | Diode MMDB7000 |
| 154 | Capacitor .01 µp |
| 158 | Op Amp LF353 |
| 160 | Resistor 10 K ohm |
| 162 | Capacitor 1000 pf |
| 164 | Resistor 20 K ohm |
| 168 | Resistor 100 ohm |
| 170 | Op Amp LF353 |
| 172 | 10 K ohm |
| 174 | Op Amp LF353 |
| 176 | Capacitor .1 µf |
| 178 | Transistor 2N4393 |
| 180 | Resistor 1 M ohm |
| 182 | Diode 1N4148 |
| 184 | Transistor 2N4393 |
| 186 | Resistor 100 K ohm |
| 188 | Diode 1N4148 |
| 190 | Resistor 1 M ohm |
| 192 | Resistor 100 K ohm |
| 194 | Resistor 10 K ohm |
| 198 | Resistor 100 ohm |
| 204 | Op Amp LF353 |
| 206 | Resistor 20 K ohm |
| 208 | Capacitor 1000 pf |
| 210 | Resistor 10 K ohms |
| 212 | Resistor 20 K ohm |
| 214 | Resistor 10 K ohms |
| 216 | Capacitor 1000 pf |
| 222 | Multiplexer ADG508A |
| 236 | Potentiometer 1000 ohm |
| 238 | Resistor 100 K ohm |
| 240 | Op Amp LF353 |
| 242 | A/D ADS7800 |
| 244 | Capacitor 47 µf |
| 248 | Resistor 1500 ohm |
| 250 | Capacitor 22 pf |
| 252 | R/D 2S82HP |
| 254 | Resistor 22 ohm |
| 256 | Resistor 22 ohm |
| 258 | Resistor 56 K ohms |
| 260 | Capacitor 1000 pf |
| 262 | Capacitor 1000 pf |
| 264 | Resistor 56 K ohms |
| 266 | Resistor 510 K ohms |
| 268 | Capacitor 1000 pf |
| 270 | Resistor 1 M ohms |
| 272 | Capacitor 100 pf |
| 274 | Resistor 510 K ohms |
| 276 | Capacitor 470 pf |
| 278 | Resistor 68 ohms |
| 280 | Jumper |
| 282 | Jumper |
| 284 | Diode 1N4148 |
| 286 | Resistor 10 K ohms |
| 288 | Diode 1N4148 |
| 290 | Resistor 10 K ohms |
| 292 | Buffer HC541 |
| 294 | Buffer HC541 |
| 296 | Buffer HC541 |
| 302 | Optoisolator MOC223 |
| 304 | Resistor 3300 ohms |
| 306 | Resistor 3300 ohms |
| 308 | Diode 1N4148 |

TABLE A-continued

| Component | Description |
|---|---|
| 310 | Capacitor .1 µf |
| 312 | Optoisolator MOC223 |
| 314 | Optoisolator MOC223 |
| 316 | Resistor 10 K ohm |
| 318 | Invertor HC14 |
| 328 | Register HC574 |
| 330 | Optoisolator MOC223 |
| 332 | Resistor 330 ohm |
| 334 | Optoisolator MOC223 |
| 336 | Optoisolator MOC223 |
| 338 | Diode 1N4148 |
| 340 | Register HC574 |
| 342 | Invertor HC14 |
| 344 | Diode IN 4148 |
| 346 | Capacitor 22 pf |
| 348 | Resistor 1 M ohm |
| 350 | Invertor HC14 |
| 352 | Diode IN 4148 |
| 354 | Capacitor 1000 pf |
| 356 | Resistor 1 M ohm |
| 358 | Invertor HC14 |
| 360 | Invertor HC14 |
| 362 | Diode IN4148 |
| 364 | Invertor HC14 |
| 366 | Resistor 1500 ohm |
| 368 | Capacitor .1 µf |
| 370 | Resistor 510 K ohm |
| 372 | Transistor MMBT2222L |
| 374 | Resistor 10 K ohm |
| 376 | LED |
| 378 | Resistor 160 ohm |
| 380 | Transistor MMBT2222L |
| 382 | Resistor 10 K ohm |
| 384 | LED |
| 386 | Resistor 160 ohm |
| 388 | LED |
| 390 | Transistor MMBT2222L |
| 392 | Resistor 10 K ohm |
| 394 | Resistor 160 ohm |
| 396 | RAM MC6226 |
| 398 | RAM MC6226 |
| 400 | RAM MC6226 |
| 402 | PROM 27C256 |
| 404 | PROM 27C256 |
| 406 | PROM 27C256 |
| 408 | DSP 56001 |
| 410 | Buffer HC541 |
| 412 | Buffer HC541 |
| 416 | Buffer HC241 |
| 650 | Invertor HC04 |
| 652 | Capacitor .1 µf |
| 654 | Resistor 3300 ohms |
| 656 | Invertor HC04 |
| 658 | Counter HC4040 |
| 660 | NOR HC02 |
| 662 | Diode IN4148 |
| 664 | Invertor HC04 |
| 666 | Resistor 1 M ohms |
| 668 | Resistor 510 K ohms |
| 670 | Invertor HC04 |
| 672 | Capacitor .1 µf |
| 674 | Invertor HC04 |
| 676 | NOR HC02 |
| 678 | Switch SPST |
| 680 | Resistor 10 K ohms |
| 682 | Op Amp LF353 |
| 684 | Resistor 10 K ohms |
| 686 | Resistor 10 K ohms |
| 688 | Op Amp LF353 |

Program for Monitoring and Controlling

The program for monitoring and controlling (PROGRAM) is described in detail in reference to FIGS. 17–20. In general, the PROGRAM allows controller 14 to carry out four main functions. The first function is to monitor and control process equipment, such as press 12, which may operate at speeds in excess of 1,000 cycles/minute. The second function is to define HIGH and LOW band data arrays. The third function is to define HIGH and LOW boundary data arrays, where two-dimensional deviation or error (i.e., deviation or error in force (strain) values and position values) is accounted for in defining the arrays. Prior art press controls only account for errors or deviations in force measurements (one-dimensional deviation). The fourth function is to define control arrays such as HIGH and LOW warning arrays, and HIGH and LOW fault arrays. The code listing for the PROGRAM is included in Appendix A located in the patented file.

Figure 17:
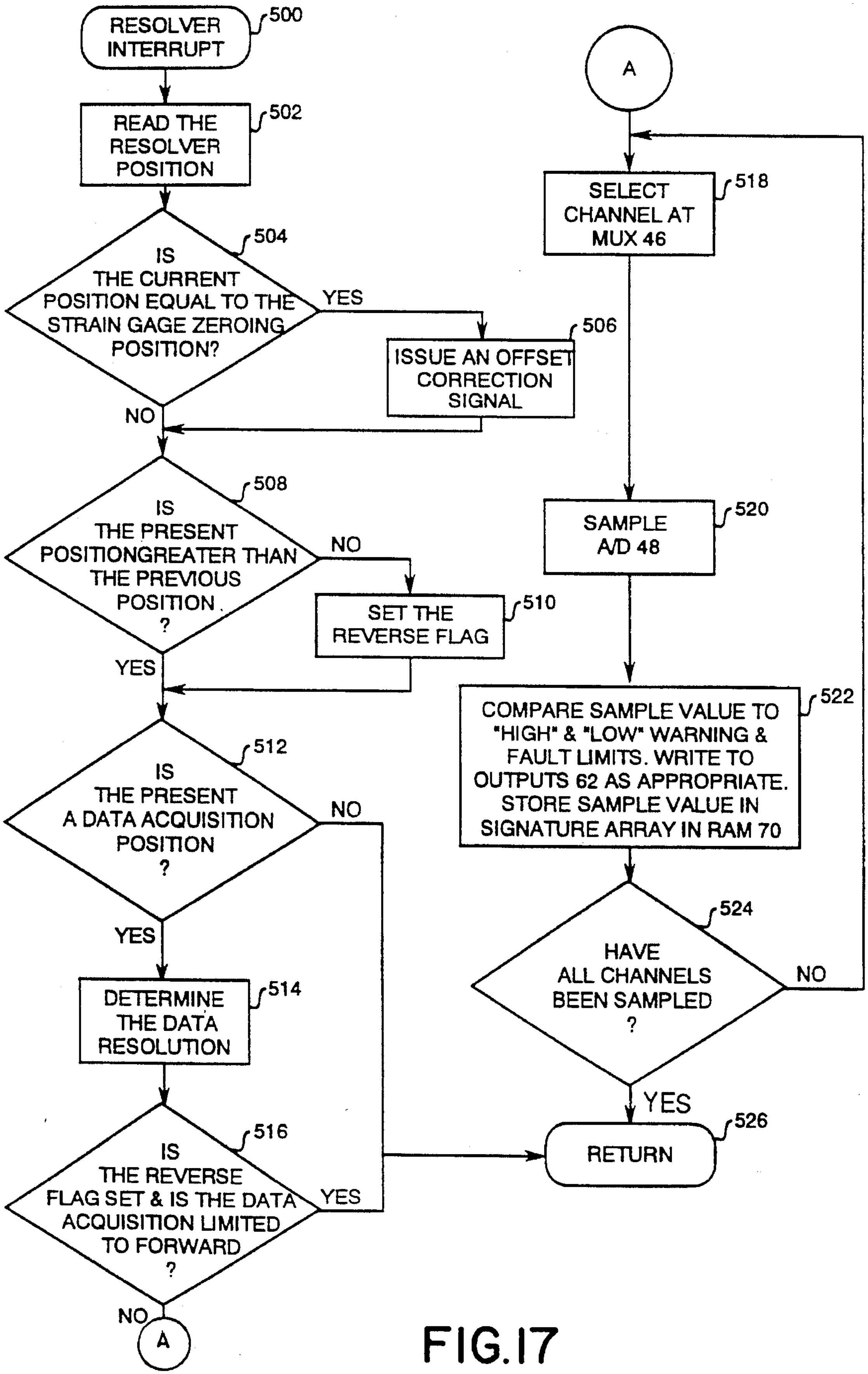
FIG. 17 is a flowchart representative of the steps executed by an embodiment of the process controller of the present invention.

Referring to FIG. 17, FIG. 17 illustrates the flowchart representing the main steps executed by process controller 14 for the purpose of monitoring and controlling press 12. Upon occurrence of a resolver interrupt (step 500) at DSP circuit 50 (IRQA, IRQB), DSP circuit 50 samples resolver buffer 56 to determine the absolute position of resolver 16 (step 502).

In step 504, DSP circuit 50 compares resolver 16 position with a position stored in RAM 70 or PROM 72 which corresponds to an offset zeroing position. If the resolver 16 position corresponds to the stored zeroing position, DSP circuit 50 applies an offset correction signal to port B buffer 58 which applies the signal to offset correction driver circuit 64. Circuit 64 increases the duration of the signal, as discussed above, and applies the signal to offset correction control circuit 66. Circuit 66 applies the offset correction signal to instrumentation amplifier and auto zero circuit 42 such that circuit 42 is zeroed (step 506).

If the current resolver 16 position is not equal to the zeroing position or after step 506, DSP circuit 50 compares the current position of resolver 16 with the greatest (most forward) previously sampled position of resolver 16 (step 508). If the current position is not greater than the previous greatest position of resolver 16, a reverse flag is set at step 510.

Subsequent to the execution of step 508, and step 510 if necessary, the current position of resolver 16 is checked by DSP circuit 50 to determine whether or not the current position is a data acquisition position (step 512). A reference array of data acquisition positions may be stored in RAM 70 or PROM 72 such that DSP circuit 50 uses the array of data acquisition positions to determine whether or not the current position is a data acquisition position. As discussed above, resolver-to-digital converter 252 may provide a resolution of 10, 12, 14 or 16 bits/resolution of resolver 16. Thus, data acquisition may occur every 0.176, 0.044, 0.011 or 0.003 degrees if necessary.

Accordingly, the data acquisition position array data is configured by the user of controller 14 based upon the positions within a press cycle which are important for acquiring data. For example, in a press such as that represented in FIG. 1, an array of data acquisition positions may be set up such that for the positions of resolver 16 corresponding to positions of workpiece 31, where tool 31 is not engaged with workpiece 40, a relatively small number of data acquisition positions may be stored in the array. However, for the positions of resolver 16 corresponding to the positions of tool 31, where tool 31 is engaged with workpiece 40, and the tool 31 is moving more slowly, the number of data acquisition positions in the array of data acquisition positions may be substantially increased. This increase provides a large number of force (strain) samples which are taken during the relatively small, but important, portion of the press cycle where tool 31 is engaged with workpiece 40. Of course, depending upon the type of press monitored and controlled by process controller 14, the data acquisition position data arrays would be modified to provide optimum force (strain) sampling for the particular press, press speed, and press operation.

The force samples are compared to the force limit data with a higher frequency when the position values correspond to an important set of tool positions than when the position values correspond to a less important set of tool positions.

If the current position at resolver 16 is not a data acquisition position, DSP circuit 50 returns to step 500. If the current position at resolver 16 is a data acquisition position, DSP circuit 50 reads the resolution at which resolver-to-digital converter is set from port B buffer 58 (step 514).

At step 516, DSP circuit 50 determines whether the reverse flag is set and determines if the data acquisition mode is limited to forward data acquisition. The user of process controller 14 has the option of limiting data acquisition from force sensors, such as strain gauges 18, to data acquisition which only occurs during forward movement of the press tool. As discussed above, the monitoring of the press may improve where force samples (data acquisition) are only taken when the tool is moving in the forward position. More specifically, where a press, such as a hydraulic press or press driven by a crankshaft, undergoes a reversal in the position of the tool due to elasticity in the press and mechanism for driving the tool, spurious force readings may be obtained which may cause controller 14 to produce an undesired warning or shutdown of the press. For example, press reversal may occur during punching operations when the tool breaks through the material being punched. Where the reverse flag is set and data acquisition is limited to forward motion of press tool 31, DSP circuit 50 returns to step 500. If the reverse flag is not set or data acquisition is not limited to forward motion of tool 31, DSP circuit 50 selects one channel at multiplexer 46 (step 518).

Subsequent to selecting a channel at multiplexer 46, DSP circuit 50 samples the digital value representative of the force (strain) at strain gauge 18 associated with the selected channel (step 520). At step 522, DSP circuit 50 stores the sample in a current signature array and compares the digital values sampled at step 520 with the values in appropriate control data arrays (HIGH and LOW warning and fault limit arrays) associated with the current position from resolver 16. The current signature array is stored as an array in a position of RAM 70 configured as a FIFO memory, or just as a set of values in RAM 70. If the sample lies outside of the warning limits, DSP circuit 50 will drive a digital output at digital output 62 via port B buffer 58 such that a warning indication, such as the lighting of an LED, will occur.

If the value sampled is outside of the HIGH and LOW fault limits, DSP circuit 50 will drive the appropriate digital output at digital output 62 such that a relay or other switch is driven to shut down press 12. By way of another example, when the value sampled falls outside of the HIGH or LOW warning or fault limits, an output at digital output 62 may be driven by DSP circuit 50 such that a product ejector is activated to eject the product formed at the time the sample at step 520 was taken. Of course, using a plurality of outputs (control) signals at digital output 62, a wide range of output actions could be taken in response to the values sampled at step 520 falling outside of the HIGH and LOW warning and fault limits.

The DSP 50 compares the sampled position value to the set of tool positions, determines the tool position corresponding to the position value, compares the sampled position value to a previously sampled position value, and compares the force value to the force limit data associated with the tool position. The DSP 50 outputs a control signal when the sampled position value corresponds to one of the position values, the sampled position value is advanced from the previously sampled position value, and the force value is greater than the force limit data.

At step 524, a determination is made as to whether all channels of multiplexer 46 have been selected such that the digital values representative of force (strain) at all strain gauges 18 are sampled. If all channels have not been sampled, a return is made to step 518 and the channel is indexed, where steps 520 and 522 are again executed. As discussed above, the number of channels selected at multiplexer 46 will depend upon the number of strain gauges 18 or other pressure, force or strain sensing devices being monitored by press controller 14. Where all channels have been sampled, return is made (step 526) and DSP circuit 50 waits for another resolver interrupt (step 500).

During the time DSP circuit 50 is waiting for a resolver interrupt, digital inputs 60 are sampled. One of the inputs at digital input 60 may be an input key which is associated with the calculation of the HIGH and LOW warning and fault limits (control data arrays) which are part of a data array which includes HIGH and LOW warning limits, and HIGH and LOW fault limits, associated with every resolver 16 position stored in the array of data acquisition positions.

Figure 18:
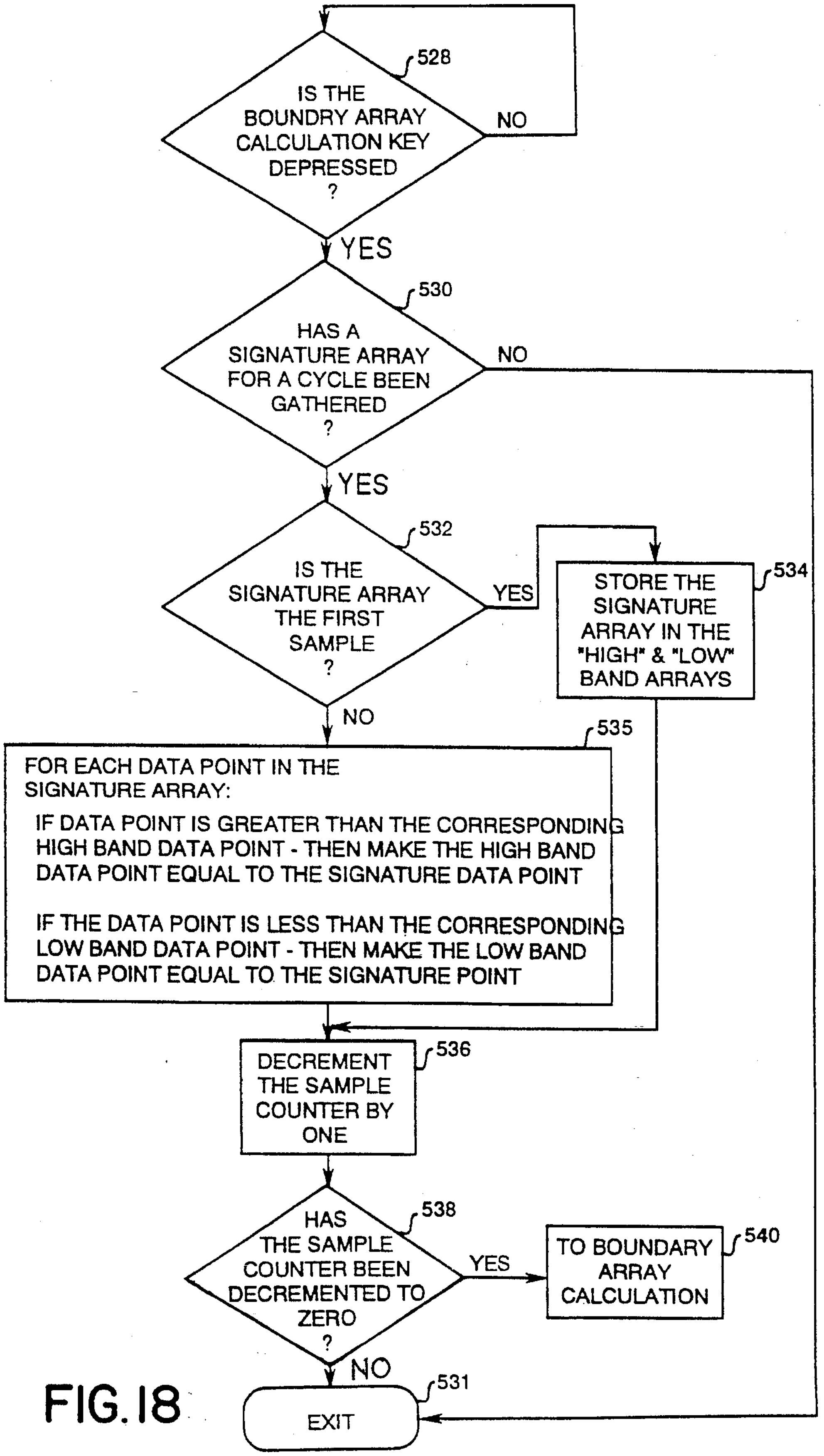
FIG. 18 is a flowchart representative of the steps executed by the process controller to establish HIGH and LOW limit arrays.
Figure 19:
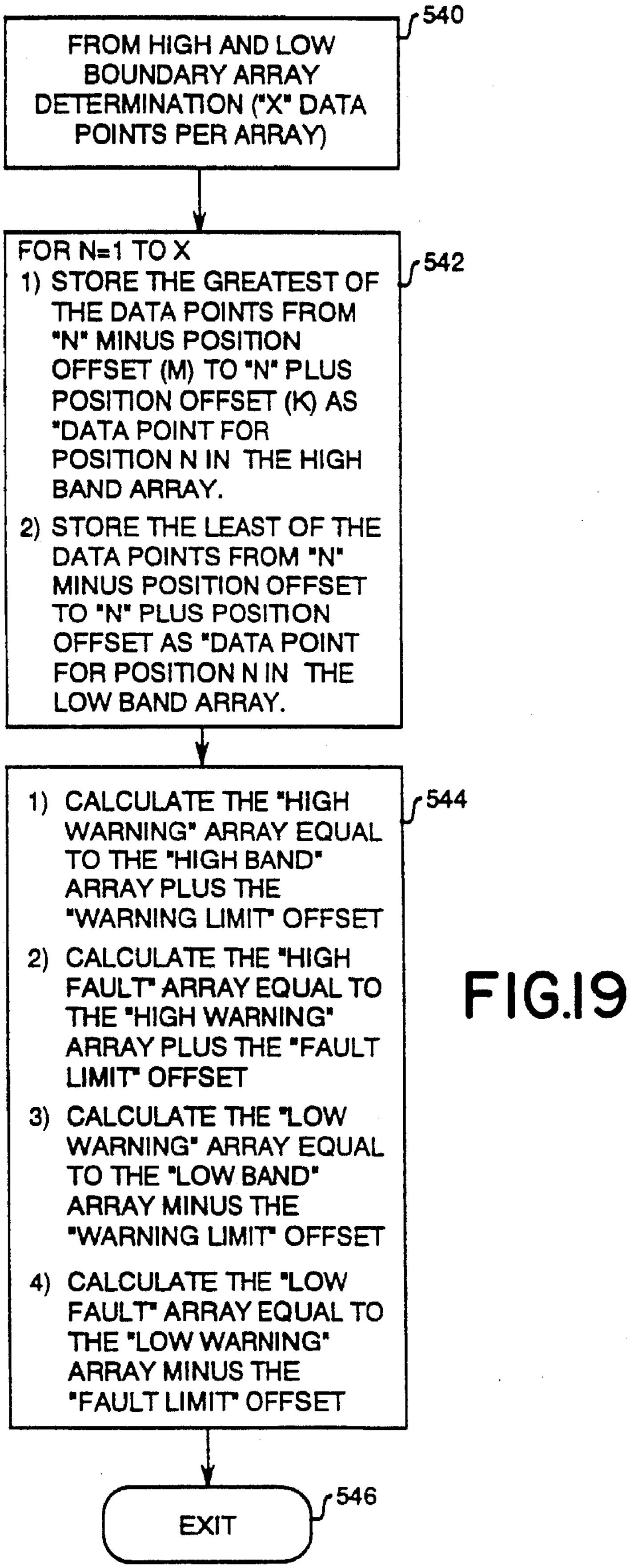
FIG. 19 is a flowchart illustrating the steps executed by an embodiment of the process controller for the purpose of establishing boundary limit arrays.

Referring to FIG. 18, FIG. 18 illustrates the steps executed by DSP circuit 50 for the purpose of establishing the HIGH and LOW warning and fault data arrays. At step 528, DSP circuit 50 samples buffer 292 at port B buffer 58 to determine if a boundary array calculation key has been depressed. When the key has been depressed, a determination is made at step 530 whether or not a signature array for a complete press 12 cycle has been collected. More specifically, DSP circuit 50 determines whether or not the current signature array residing in RAM 70 includes force (strain) data for every position of the array of data acquisition positions. If a complete signature array has not been collected, DSP circuit 50 discontinues execution of the boundary array determination routine (step 531).

If a complete signature array has been gathered, a determination is made as to whether the signature array is the first sampled signature array for the purposes of calculating the boundary arrays (step 532). If the signature array is the first sampled signature array, this signature array is stored in a HIGH band array and a LOW band array in RAM 70 (step 534) and the process proceeds to step 536. Otherwise, the process proceeds to step 535.

At step 535, each data value of each subsequent signature array is compared with the data values in the HIGH and LOW band arrays associated with the same position of the data value in the signature array. If a signature data value is greater than the corresponding HIGH band data value, then the HIGH band data value is replaced by the signature data value. If the data value is less than the corresponding LOW band data value, the LOW band data value is replaced by the signature data value. If the data value falls between the corresponding HIGH and LOW band data values, action is not taken.

At step 536, a sample counter is decremented by 1. The number of signature arrays used to determine the boundary arrays is set by the user and is variable. The sample counter resides in RAM 70, and may have a default value stored in PROM 72. By way of example, the user of controller 14 may determine that a number (J) signature arrays provides for the determination of boundary arrays which provide proper monitoring and control of press 12 by controller 14. Thus, this number (J) would be stored as the sample counter. At step 538, the sample counter is read. If the sample counter has been decremented to zero, the boundary array calculation routine is executed (step 540, FIG. 19). If the sample counter has not been decremented to zero, the boundary array calculation routine is exited (step 531).

Figure 20:
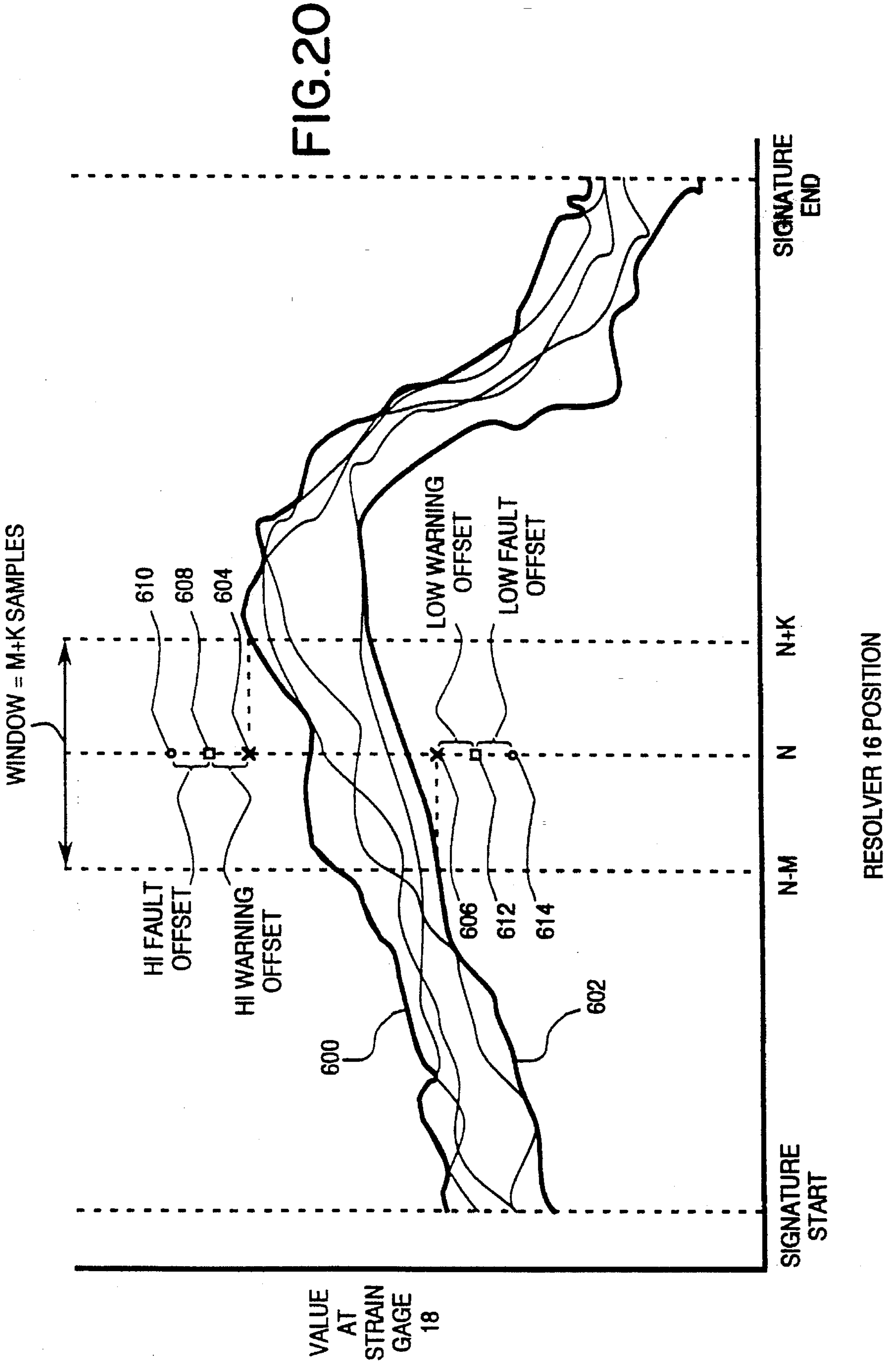
FIG. 20 is a graph representing limit arrays.

Referring to FIG. 20, 5 (J=5) signature arrays are plotted on a graph, where the values at one strain gauge 18 are plotted against associated resolver 16 positions. (Of course, in practice, each signature array would have two strain gauge values for each position. However, for purposes of simplicity, only one strain gauge value is shown for each position of each signature array.) The result of executing step 535 is that an envelope is created, where the boundaries of the envelope are represented by the HIGH band array 600 and the LOW band array 602. More specifically, HIGH band array 600 includes all of the maximum values of the 5 signature arrays, and LOW band array 602 includes all of the lowest values of the 7 signature arrays.

Referring again to step 540, FIG. 19 illustrates the steps taken in the boundary array calculation routine. As discussed above, DSP circuit 50 compares digital values sampled at step 20 (FIG. 17) with values in appropriate control (boundary) data arrays which may take the form of HIGH and LOW warning and fault limit arrays. Of course, depending upon the application, any number of limit arrays may be chosen such that controller 14 provides the appropriate monitoring and control of a press. For example, HIGH and LOW warning, fault and impending problem arrays may be set up where a digital value falling outside of the impending problem array may cause DSP circuit 50 to produce an impending problem signal at an LED or other indicator coupled to digital output circuit 62.

The HIGH and LOW warning and fault arrays are calculated based upon HIGH and LOW boundary arrays calculated at step 542. The calculation of the boundary arrays takes into account the two-dimensional deviation which occurs during the monitoring of press 12. More specifically, previous press monitoring and controlling schemes only consider deviation or error within the sampling of the force at the monitored press. Controller 14 provides two-dimensional deviation compensation in that it also accounts for deviation and error which may occur in the sampling of the position at resolver 16.

Referring to FIG. 20, the HIGH and LOW boundary arrays are established based upon the HIGH and LOW band data arrays. More specifically, to calculate the HIGH boundary array, the strain values for each specific tool position within the HIGH band data array is read along with the strain values for M tool positions before the specific position and K tool positions after the specific position. The value written into the HIGH boundary array for the specific position is the highest of the strain values which occurs within the window of tool positions located about the specific position, where the window is M+K samples. The width of the window is stored as a default value within PROM 72. By way of example, the width of the window may be 5 samples. The LOW boundary array is developed in a manner similar to that of the HIGH boundary array. More specifically, all of the strain values occurring within the position window located about the specific position are read from the LOW band data array and the lowest of these values is stored in the LOW boundary array for the specific position. Referring again to FIG. 20, the points 604 and 606 would be the strain values stored in the boundary array for the Nth position.

At step 544, the HIGH and LOW warning and fault arrays are calculated. In particular, for each strain value present in the HIGH boundary array, HIGH warning and HIGH fault arrays are developed by adding warning and fault offset values to the strain values for each position in the boundary array. To develop the LOW warning and fault arrays, the strain values for each position in the boundary array are reduced by LOW warning and fault offsets before storage in the LOW warning and fault arrays. Thus, for position N, strain value 608 would be stored in the HIGH warning array, strain value 610 would be stored in the HIGH fault array, strain value 612 would be stored in the LOW warning array, and strain value 614 would be stored in the LOW fault array.

The HIGH fault offset value, HIGH warning offset value, LOW warning offset value, and LOW fault offset value may have default values stored in PROM 72, but may be modified, depending upon the application. Additionally, these values may be configured independently of each other such that these values are all different.

Upon completion, the boundary array calculation is exited (step 546).

It will be understood that the above description is of the preferred exemplary embodiment of the invention and that the invention is not limited to the specific form shown. For example, depending upon the future developments of hardware and software, various portions of the software may be reconfigured into hardware logic to increase the speed of controller 14, whereas the function of certain hardware may be better performed by appropriately programmed hardware. Furthermore, it is contemplated that the force within a press may be related to strain at press members, pressure at press hydraulics, or power consumption by the motor driving a mechanical press or the hydraulics thereof. More specifically, the current draw by the motor of machine drive 20 and monitoring thereof may provide adequate information such that controller 14 may properly monitor and control a particular press 12. As is conventional in the art, the current at a motor is easily monitored with the use of current transformers, where the voltage representative of the current at the motor derived from the current transformers is applied to instrumentation amplifier and automatic offset correction circuit 42. Various other substitutions, modifications, changes and omissions may be made in the design and arrangement of the preferred embodiment without departing from the spirit of the invention as expressed in the appended claims.

What is claimed:

1. A press controller, where the press includes a tool, a mechanism for moving the tool through a cycle, a sensor coupled to the press, and a position transducer coupled to the press, where the sensor produces a first signal representative of the forces applied by the press to the tool and the transducer produces a second signal representative of the position of the tool, the press controller comprising:

a monitoring circuit, couplable to the sensor and transducer, which samples the first and second signals to produce first values and position values respectively;

a memory disposed to store predefined sets of tool positions within the cycle and force limit data associated with each tool position; and a processor coupled to the monitoring circuit, press and memory, the processor being disposed to compare the sampled position value to the tool positions, determine the tool position corresponding to the position value, and compare the first values to the force limit data associated with the tool position, said processor controlling said press in response to said comparisons, where force limit data associated with each tool position includes a high band value and a low band value, the processor, during a plurality of data gathering cycles, being disposed to:

store each first value in the memory in reference to the associated tool position during the first of the data gathering cycles as the high band value and the low band value associated with the tool position;

compare each first value to the high and low band values associated with the tool positions, and replace the high band value with the first value when the first value is greater than the high band value and replace the low band value with the first value when the first value is less than the low band value, for each data gathering cycle subsequent to the first data gathering cycle; and read the high and low band values associated with one tool position, the M tool positions before the one tool position and the K tool positions after the one tool position, where the greatest high band value is stored in the memory as a high limit value associated with the one tool position and the lowest low band value is stored in the memory as a low limit value associated with the one tool position.

* * * * *

UNITED STATES PATENT AND TRADEMARK OFFICE
CERTIFICATE OF CORRECTION

PATENT NO. : 5,491,647

DATED : February 13, 1996

INVENTOR(S) : Michael J. O'Brien

It is certified that error appears in the above-identified patent and that said Letters Patent is hereby corrected as shown below:

Column 3, line 53, "configure" should be --configured--.

Column 8, line 55, "200" should not be in bold.

Column 10, line 4, "inventor" should be --invertor--.

Column 12, line 15, "15" should be --10--.

Column 13, line 17, "inventor" should be --invertor--.

Column 14, line 9, "inventor" should be --invertor--.

Column 14, line 13, "inventor" should be --invertor--.

Column 14, line 14, "inventor" should be --invertor--.

Column 14, line 17, "inventor" should be --invertor--.

Column 14, line 18, "inventor" should be --invertor--.

Column 14, line 19, "inventor" should be --invertor--.

Column 14, line 20, "inventor" should be --invertor--.

UNITED STATES PATENT AND TRADEMARK OFFICE
CERTIFICATE OF CORRECTION

PATENT NO. : 5,491,647

DATED : February 13, 1996

INVENTOR(S) : Michael J. O'Brien

It is certified that error appears in the above-indentified patent and that said Letters Patent is hereby corrected as shown below:

Column 14, line 23, both occurrences of "inventor" should be --invertor--.

Column 14, line 26, "inventor" should be --invertor--.

Column 23, line 47, "What is claimed" should be in all capital letters.

Signed and Sealed this

Twenty-fourth Day of September, 1996

Attest:

BRUCE LEHMAN

*Attesting Officer*

*Commissioner of Patents and Trademarks*